(12) United States Patent
Kashiwakura

(10) Patent No.: US 8,990,761 B2
(45) Date of Patent: Mar. 24, 2015

(54) DECOUPLING METHOD, APPRATUS FOR DESIGNING POWER FEEDING LINE, AND CIRCUIT BOARD

(75) Inventor: Kazuhiro Kashiwakura, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 14/007,892

(22) PCT Filed: Mar. 28, 2012

(86) PCT No.: PCT/JP2012/058077
§ 371 (c)(1),
(2), (4) Date: Sep. 26, 2013

(87) PCT Pub. No.: WO2012/133496
PCT Pub. Date: Oct. 4, 2012

(65) Prior Publication Data
US 2014/0016282 A1    Jan. 16, 2014

(30) Foreign Application Priority Data
Mar. 29, 2011    (JP) .................................. 2011-071272

(51) Int. Cl.
*G06F 17/50* (2006.01)
*H05K 1/18* (2006.01)
*H05K 1/02* (2006.01)

(52) U.S. Cl.
CPC ............... *H05K 1/18* (2013.01); *H05K 1/0253* (2013.01); *G06F 17/5068* (2013.01); *H05K 1/0225* (2013.01); *G06F 17/5036* (2013.01); *G06F17/5072* (2013.01); *H05K 1/0231* (2013.01); *H05K 1/0243* (2013.01); *G06F 2217/78* (2013.01); *G06F 2217/82* (2013.01)
USPC ........................................................ 716/137

(58) Field of Classification Search
CPC ............ G06F 17/5036; G06F 17/5068; G06F 17/5072; G06F 17/5063; G06F 17/5045; G06F 17/5077; G06F 17/505; G06F 2217/62; G06F 2217/82; H05K 1/0231; H05K 1/185; H05K 1/165; H05K 2201/09309; H05K 2201/10545; H05K 2201/10689; H05K 2201/10734; H05K 2201/093
USPC ........................................................ 716/137
See application file for complete search history.

(56) References Cited

U.S. PATENT DOCUMENTS 8,108,163 B2    1/2012  Kashiwakura (Continued)

FOREIGN PATENT DOCUMENTS

JP    2001-175702    6/2001
JP    2005-011938    1/2005

(Continued)

OTHER PUBLICATIONS

International Search Report, PCT/2012/058077, Jun. 19, 2012.

*Primary Examiner* — Vuthe Siek
*Assistant Examiner* — Aric Lin
(74) *Attorney, Agent, or Firm* — Young & Thompson

(57) ABSTRACT

A method includes: with a setting frequency set as an operating frequency of an LSI, selecting a capacitor having a lowest resonant impedance and a resonant frequency close to the setting frequency with reference to a capacitor characteristic database and installing one or more capacitors, each being the selected capacitor, as high frequency decoupling capacitors, the number thereof corresponding to a value obtained by dividing the upper limit of the power feeding line impedance by a resonant impedance of the capacitor.

13 Claims, 14 Drawing Sheets

(56) References Cited

U.S. PATENT DOCUMENTS

| | | |
|---|---|---|
| 8,160,828 B2 | 4/2012 | Kashiwakura |
| 8,200,445 B2 | 6/2012 | Kashiwakura |
| 2005/0114054 A1 | 5/2005 | Shimazaki et al. |
| 2009/0234602 A1 | 9/2009 | Kashiwakura |
| 2009/0234605 A1 | 9/2009 | Kashiwakura |
| 2009/0248343 A1 | 10/2009 | Kashiwakura |
| 2012/0059614 A1 | 3/2012 | Kashiwakura |

FOREIGN PATENT DOCUMENTS

| | | |
|---|---|---|
| JP | 2005-157801 | 6/2005 |
| JP | 2005-321864 | 11/2005 |
| JP | 2007-234853 | 9/2007 |
| JP | 2007-258310 | 10/2007 |
| JP | 2009-217621 | 9/2009 |
| JP | 2009-217622 | 9/2009 |
| JP | 2009-230694 | 10/2009 |
| JP | 2010-287740 | 12/2010 |
| JP | 2011-014028 | 1/2011 |

FIG. 7

| a [mm] | b [mm] | √( a × b ) [mm] | RESONANT FREQUENCY [MHz] (ANALYSIS) | RESONANT FREQUENCY [MHz] FORMULA a ← √( a × b ) |
|---|---|---|---|---|
| 10 | 90 | 30 | 610 | 777 |
| 20 | 80 | 40 | 550 | 583 |
| 30 | 70 | 46 | 490 | 509 |
| 40 | 60 | 49 | 470 | 476 |
| 50 | 50 | 50 | 460 | 466 |

FIG. 10

| CAPACITANCE [F] | RESONANT FREQUENCY [Hz] | RESONANT IMPEDANCE Zc [Ω] |
|---|---|---|
| 5.00E-13 | 1.21E+10 | 4.87E-01 |
| 1.00E-12 | 8.23E+09 | 8.94E-01 |
| 1.20E-12 | 7.16E+09 | 7.58E-01 |
| 1.50E-12 | 6.96E+09 | 7.11E-01 |
| 1.80E-12 | 6.50E+09 | 4.98E-01 |
| 2.20E-12 | 5.50E+09 | 4.40E-01 |
| 2.70E-12 | 5.13E+09 | 3.77E-01 |
| 3.30E-12 | 4.72E+09 | 4.11E-01 |
| 3.90E-12 | 4.34E+09 | 3.36E-01 |
| 4.70E-12 | 3.94E+09 | 3.83E-01 |
| 5.60E-12 | 3.73E+09 | 3.38E-01 |
| 6.80E-12 | 3.38E+09 | 3.14E-01 |
| 8.20E-12 | 3.03E+09 | 2.87E-01 |
| 1.00E-11 | 2.60E+09 | 3.82E-01 |
| 1.20E-11 | 2.39E+09 | 3.54E-01 |
| 1.50E-11 | 2.11E+09 | 3.69E-01 |
| 1.80E-11 | 1.91E+09 | 3.65E-01 |
| 2.20E-11 | 1.74E+09 | 3.28E-01 |
| 2.70E-11 | 1.60E+09 | 2.96E-01 |
| 3.30E-11 | 1.39E+09 | 2.46E-01 |
| 3.90E-11 | 1.33E+09 | 2.19E-01 |
| 4.70E-11 | 1.25E+09 | 1.96E-01 |
| 5.60E-11 | 1.01E+09 | 2.96E-01 |
| 6.80E-11 | 8.79E+08 | 3.15E-01 |
| 8.20E-11 | 8.43E+08 | 2.30E-01 |
| 1.00E-10 | 7.66E+08 | 2.04E-01 |
| 1.20E-10 | 7.55E+08 | 1.33E-01 |
| 1.50E-10 | 6.75E+08 | 1.36E-01 |
| 1.80E-10 | 6.39E+08 | 1.18E-01 |
| 2.20E-10 | 5.41E+08 | 1.22E-01 |
| 2.70E-10 | 5.05E+08 | 1.05E-01 |
| 3.30E-10 | 4.16E+08 | 1.02E-01 |
| 3.90E-10 | 4.09E+08 | 8.59E-02 |
| 4.70E-10 | 3.99E+08 | 7.06E-02 |
| 5.60E-10 | 3.42E+08 | 7.39E-02 |
| 6.80E-10 | 3.24E+08 | 6.50E-02 |
| 8.20E-10 | 2.98E+08 | 6.06E-02 |
| 1.00E-09 | 2.85E+08 | 5.28E-02 |
| 1.50E-09 | 2.35E+08 | 2.03E-01 |
| 2.20E-09 | 1.94E+08 | 1.72E-01 |
| 3.30E-09 | 1.55E+08 | 1.35E-01 |
| 4.70E-09 | 1.33E+08 | 1.02E-01 |
| 6.80E-09 | 1.06E+08 | 7.88E-02 |
| 1.00E-08 | 9.28E+07 | 5.72E-02 |
| 2.20E-08 | 5.63E+07 | 4.62E-02 |
| 4.70E-08 | 4.15E+07 | 2.64E-02 |
| 1.00E-07 | 2.66E+07 | 1.94E-02 |
| 2.20E-07 | 1.83E+07 | 2.89E-02 |
| 4.70E-07 | 1.24E+07 | 1.78E-02 |
| 1.00E-06 | 8.88E+06 | 8.50E-03 |
| 2.20E-06 | 6.19E+06 | 7.03E-03 |
| 4.70E-06 | 3.96E+06 | 6.76E-03 |
| 1.00E-05 | 2.90E+06 | 5.50E-03 |
| 2.20E-05 | 1.85E+06 | 3.40E-03 |
| 4.70E-05 | 7.50E+05 | 2.40E-03 |
| 1.00E-04 | 5.01E+05 | 6.39E-04 |

DECOUPLING METHOD, APPRATUS FOR DESIGNING POWER FEEDING LINE, AND CIRCUIT BOARD

CROSS-REFERENCE TO RELATED APPLICATIONS

This application is based upon and claims the benefit of the priority of Japanese patent application No. 2011-071272 filed on Mar. 29, 2011, the disclosure of which is incorporated herein in its entirety by reference thereto.

TECHNICAL FIELD

The present invention relates to a decoupling method, apparatus for designing power feeding line, and circuit board.

BACKGROUND

With an improvement of processing capability of a communication apparatus and an information processing apparatus, an operating frequency of an LSI (Large Scale Integrated circuit) mounted on the apparatus increases and so does the frequency of noise components going round into a power feeding line. Commonly used decoupling technology is incapable of suppressing noise of approximately 10 MHz and less.

FIG. 1 is a diagram for explaining an example (prototype) of a decoupling technology in a power feeding line (also termed as feed line or power feed line). In the example shown in FIG. 1, an OBP (On Board Power-supply) 101 on a printed circuit board 100 supplies power to a plurality of LSIs (Large Scale Integrated Circuit) 103 via a common power feeding line 102. Low frequency decoupling capacitors 104 are provided a little away from the LSIs 103. High frequency decoupling capacitors 105 are provided neighboring to each LSI 103. In general, a decoupling capacitor (also known as "bypass capacitor") is used to suppress power supply noise and EMI (Electro Magnetic Interference) generated from an electronic device. A decoupling capacitor is connected between a power supply and a ground (GND) of a power feeding line to reduce an impedance of a power supply line for a high frequency.

A ceramic capacitor (laminated ceramic chip capacitor) or the like is used as the high frequency decoupling capacitor 105. The high frequency decoupling capacitor 105 is provided neighboring to a high frequency circuit in order to reduce a path impedance to the high frequency circuit. The low frequency decoupling capacitor 104 is normally provided for each board.

In the example of the power feeding line shown in FIG. 1, a power supply solid layer (power supply plane) or a ground (GND) solid layer (ground plane) is provided over the entire surface of a board plane. Assuming that vertical and horizontal dimensions of the rectangular shaped printed circuit board 100 are B and A, respectively, a board area is $Sb=A \times B$, and a maximum power feeding area is $S=A \times B$.

FIG. 2 shows a decoupling effect. An abscissa and an ordinate indicate frequency and impedance, respectively. A power feeding line (board) stand-alone characteristic, a capacitor stand-alone characteristic, and the characteristic (impedance) when the capacitor is installed on the power feeding line are plotted. The characteristics in FIG. 2 indicate that the decoupling capacitor reduces the power feeding line impedance and contributes to the noise absorption. The capacitor installed has a self resonant frequency (a resonant frequency shown in the "capacitor stand-alone characteristic" in FIG. 2) lower than the self resonant frequency of the board alone.

Further, the capacitor is treated as an LCR series resonance circuit having parasitic components such as ESP (Equivalent Series Resistance) and ESL (Equivalent Series Inductance), and its impedance Z is given by $$Z=R+j\omega L+(1 \div (j\omega C)), \text{ and}$$

the resonant frequency f is given by $$f=1 \div \{2\pi \sqrt{(LC)}\}$$

where R is a resistance (ESR),
L is an inductance (ESL),
C is a capacitance,
$\omega = 2\pi f$, and
$j^2 = -1$ (^ is an exponential operator).

The characteristics (an abscissa: frequency, an ordinate: impedance) shown in FIG. 3 are plots when a self resonant frequency of a capacitor is higher than a self resonant frequency of a board alone. The graph indicates that no decoupling effect is obtained even in a frequency domain where a capacitor stand-alone characteristic exhibits lower impedance than the board stand-alone characteristic. The "capacitor+board characteristic," the characteristic when the decoupling capacitor is mounted on the board, are the same as the "board stand-alone characteristic" (i.e., no decoupling effect).

A line speed of a communication apparatus in recent years has increased, and a processing speed of an apparatus processing line data such as a server, a PC (Personal Computer) continues to increase. For instance, a signal speed between a CPU (Central Processing Unit) and a memory is nearly 1 GHz (Giga Hertz), and noise components going round into a power feeding line have been made to a high frequency. This causes a problem that decoupling cannot be achieved.

For instance, the following literatures regarding the decoupling technology are known, but none solves the problem above.

Patent Literature 1 discloses a circuit designing method capable of disposing a bypass capacitor having an optimum capacitance value at an optimum location and reducing noise accompanying power supply voltage variation, while verifying effects in detail by first temporarily setting a capacitance of a bypass capacitor and a location thereof; then processing an impedance-frequency characteristic in a current path including this capacitor based on a predetermined arithmetic equation using a central processing unit (computer); displaying a frequency response graph on a screen of a display apparatus; having a designer evaluating the frequency response graph displayed on the display apparatus; and by determining an optimum capacitance value of the bypass capacitor by repeating this operation until an operating frequency comes close to a resonant frequency fr. In other words, the literature discloses a method that derives an optimum capacitance value of a bypass capacitor by actually installing the capacitor and calculating the characteristic thereof. Patent Literature 1, however, does not disclose that the characteristic of a bypass capacitor is not effective, depending on resonance condition of a wiring pattern itself. Further, the technology disclosed in Patent Literature 1 has a disadvantage that a solution cannot be derived when the resonant frequency of the wiring pattern is lower than the resonant frequency of the capacitor.

Patent Literature 2 discloses a checking method comprising: calculating an inductance of a wire from printed board design data 103; calculating a capacitance between a power supply plane layer and a ground plane layer; and calculating relation between an impedance between a power supply pin and a ground pin of an IC and a frequency from a characteristic of a bypass capacitor, an inductance of each wire, and an electrostatic capacity between the plane layers. The checking method further comprises: calculating a required impedance at an operating frequency of the IC, and compares the aforementioned impedance and the required impedance to decide whether the bypass capacitor is valid or invalid. This method is effective in examining a bypass capacitor having a self resonant frequency not higher than that of the power feeding line. However, Patent Literature 2 does not disclose any decoupling technique for the case wherein a bypass capacitor has a self resonant frequency higher than that of the power feeding line.

Patent Literature 3 discloses a printed wiring board that reduces the number of electronic components for reducing EMI and simplifies a board design by forming a wiring pattern (bypass pattern) for an electrical AC connection between each of power supply planes so that the wiring patterns stride over a region corresponding to a position of a first power supply plane (VCC1) and a region corresponding to a position of a second power supply plane (VCC2), and a region corresponding to a position of the second power supply plane (VCC2) and a region corresponding to a position of a third power supply plane (VCC3) in a signal layer directly under a power supply layer. The technology suppresses EMI (Electro Magnetic Interference) by providing a floating wiring region in a slit between different power feeding lines, however, it does not contribute in any way to the high frequency decoupling technology.

Patent Literature 4 discloses a mounting structure in which three power supply layers formed on an upper surface of or inside a mount board, a common ground layer formed on a plane different from the three power supply layers of the mount board, a power supply line disposed outside the mount board, and an IC as an electronic part, to which power is supplied from the plurality of power supply layers, are provided, chip-type three-terminal capacitors are mounted on the upper surface of the mount board, input and output electrodes of each of the chip-type three-terminal capacitors are electrically connected to two power supply layers so as to be inserted into a power supply current path constituted by the three power supply layers and the power supply line and a ground electrode of each three-terminal capacitor is electrically connected to the common ground layer. Patent Literature 4 discloses a power feeding line structure in which three layers of power feeding lines are connected by three-terminal capacitors. However, wiring design is complicated, the characteristic of the power feeding line for frequency components of noise are not reflected, and the technology is limited in terms of suppressing high frequency noise.

Patent Literature 5 discloses a method, apparatus and program that perform noise analysis on a printed wiring board and capable of verifying design appropriateness regarding power supply noise suppression.

Patent Literature 6 discloses a power supply noise analysis method and system for a electronic circuit board, and program, that comprises:

calculating a reflection voltage of an LSI based on an impedance characteristic between a power supply and ground of the electronic circuit board and an impedance characteristic between a power supply and ground of an LSI mounted on the board, calculating a power supply noise flowing from the LSI to the electronic circuit board, calculating propagation of the power supply noise flowing from the LSI to the electronic circuit board, analyzing the power supply noise of the entire electronic circuit board based on a superposition principle, and deciding appropriateness.

Patent Literature 7 discloses a method and apparatus for reproducing a mechanism of power supply noise generation, making it possible to grasp power supply noise in a design stage of a printed circuit board, and for deriving an input impedance between a power supply and GND of an LSI, that calculate a power supply input impedance of an LSI from the number of output buffers of the LSI, an output impedance of the output buffer, a characteristic impedance of power supply/GND of each of an LSI terminal, a package, and a chip terminal part, a characteristic impedance of a signal, a characteristic impedance of a wiring connected to an LSI output terminal, and a damping resistance of an output signal.

Each of Patent Literatures 5, 6, and 7 discloses a technique for analyzing a power feeding line and a technology for deriving a target impedance. There is not disclosed an effect on decoupling given by a size of a power feeding line at a high frequency.

In Patent Literature 8, a region to which a resistance element can be added later is provided between power supply terminals of an LSI, and consequently a Q value of a power supply resonance (resonance of a power supply noise) caused by a capacity component inside the LSI and an inductance component that a package and a board have is lowered to suppress the power supply noise. Further, when an impedance characteristic in a low frequency band deteriorates due to addition of a resistance element, a capacitance element is added to a power supply circuit. Further, Patent Literature 8 discloses the structure of a printed wiring board power supply circuit designing apparatus that makes a decision based on a power supply noise, regarding insertion of a resistance element between the power supply terminals of the LSI and addition of a capacitance element in the PCB on which the LSI having the additional region for resistance element is mounted. It is a technology that reduces a resonance level by inserting a resistance element in a power feeding line. In Patent Literature 8, there is not disclosed any technology regarding decoupling at a high frequency caused by a size of a power feeding line, either.

[PTL 1]
Japanese Patent Kokai Publication No. JP2001-175702A
[PTL 2]
Japanese Patent Kokai Publication No. JP2007-234853A
[PTL 3]
Japanese Patent Kokai Publication No. JP2007-258310A
[PTL 4]
Japanese Patent Kokai Publication No. JP2005-011938A
[PTL 5]
Japanese Patent Kokai Publication No. JP2009-230694A
[PTL 6]
Japanese Patent Kokai Publication No. JP2009-217621A
[PTL 7]
Japanese Patent Kokai Publication No. JP2009-217622A
[PTL 8]
Japanese Patent Kokai Publication No. JP2010-287740A

SUMMARY

Each disclosure of Patent Literatures listed above is incorporated herein in its entirety by reference thereto. As described above, common decoupling technologies are incapable of suppressing noise of about 10 MHz or below. Therefore, a decoupling technology at frequencies from several hundreds of MHz to several GHz is demanded.

The present invention is invented in view of the above mentioned problem, and an object of the present invention is to provide a method, apparatus, and circuit board that can achieve decoupling at a high frequency and can perform power supply noise suppression adapted to a high speed operation.

According to the present invention, there is provided a decoupling method that performs decoupling for a circuit board having an LSI mounted thereon using a data processing apparatus, wherein the method comprises:

(a) deriving a maximum area of a power feeding line for an operating frequency of the LSI based on design information of the circuit board;

(b) deriving an upper limit of a power feeding line impedance, which is a power supply variation tolerance, based on the design information of the circuit board; and (c) for at least one setting frequency that is equal to or lower than the operating frequency and is in a frequency range higher than a self resonant frequency of a power feeding line having an area equivalent to that of the circuit board, selecting a capacitor having the lowest resonant impedance and a resonant frequency close to the setting frequency with reference to a capacitor characteristic database that stores capacitor characteristic information including at least resonant frequency and resonant impedance information of a capacitor, and installing one or more capacitors, each being the selected capacitor, each being the selected capacitor, as high frequency decoupling capacitors, the number thereof corresponding to a value obtained by dividing the upper limit of the power feeding line impedance by the resonant impedance of the selected capacitor.

According to another aspect of the present invention, there is provided an apparatus for designing power feeding line that performs decoupling for a circuit board having an LSI mounted thereon, wherein the apparatus comprises:

a capacitor characteristic database that stores a capacitance value of a capacitor associated with a resonant frequency thereof; and means for executing the following processing (a) to (c):

(a) deriving a maximum area of a power feeding line for an operating frequency of the LSI, based on design information of the circuit board;

(b) deriving an upper limit of a power feeding line impedance based on the design information of the circuit board, the upper limit being a power supply variation tolerance;

(c) for one or a plurality of setting frequencies, each being equal to or lower than the operating frequency and being in a frequency range higher than a self resonant frequency of a power feeding line having an area equivalent to an area of the circuit board, selecting a capacitor having a lowest resonant impedance and a resonant frequency close to the setting frequency, with reference to the capacitor characteristic database that stores capacitor characteristic information including at least resonant frequency and resonant impedance information of a capacitor, and installing one or more capacitors, each being the selected capacitor, as high frequency decoupling capacitors, the number thereof corresponding to a value obtained by dividing the upper limit of the power feeding line impedance by the resonant impedance of the selected capacitor.

According to yet another aspect of the present invention, there is provided a circuit board having an LSI mounted thereon, the board comprising: one or more capacitors, each having a lower resonant impedance and a resonant frequency close to a predetermined setting frequency that is equal to or lower than an operating frequency of the LSI and is in a frequency range higher than a self resonant frequency of a power feeding line having an area equivalent to an area of the circuit board, as high frequency decoupling capacitors, the number of the one or more capacitors corresponding to at least a value obtained by dividing an upper limit of the power feeding line impedance by the resonant impedance of the capacitor.

According to the present invention, it is possible to achieve decoupling at a high frequency and to perform power supply noise suppression adapted to a high speed operation.

Still other features and advantages of the present invention will become readily apparent to those skilled in this art from the following detailed description in conjunction with the accompanying drawings wherein only exemplary embodiments of the invention are shown and described, simply by way of illustration of the best mode contemplated of carrying out this invention. As will be realized, the invention is capable of other and different embodiments, and its several details are capable of modifications in various obvious respects, all without departing from the invention. Accordingly, the drawing and description are to be regarded as illustrative in nature, and not as restrictive.

BRIEF DESCRIPTION OF THE DRAWINGS

FIG. 7 is a diagram showing the differences between the results of the analysis of the power feeding line impedance in FIG. 6 and a expression (6) above.

FIG. 10 is a diagram showing an example of a database of capacitance, resonant frequency, and resonant impedance.

PREFERRED MODES

According to the present invention, a high frequency decoupling technology can be established, power supply noise suppression adapted to a high speed operation of apparatuses can be possible, and this leads to product quality improvement. According to the present invention, there is provided a design method that estimates the self resonant frequency of a wiring pattern in advance.

Figure 4:
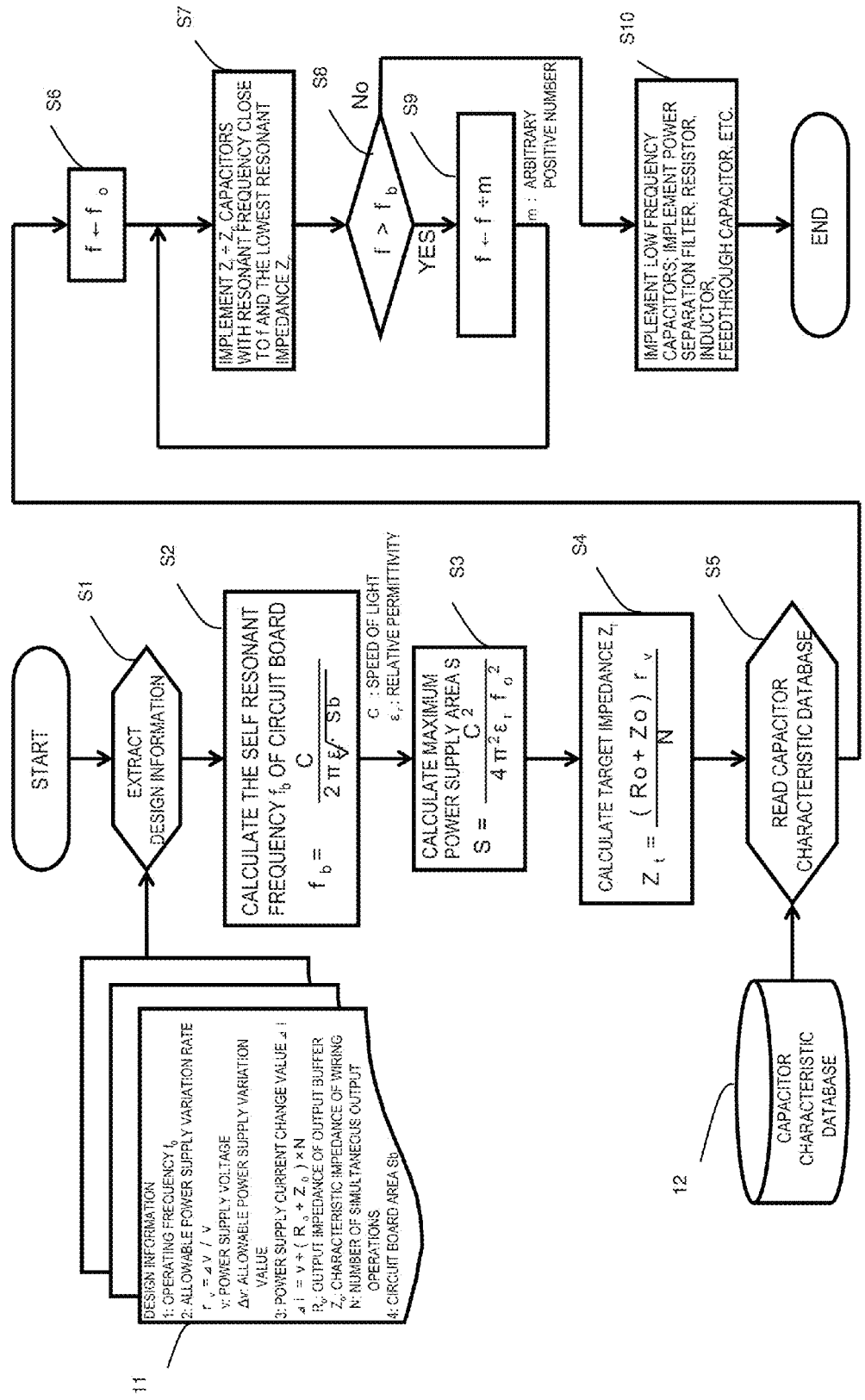
FIG. 4 is a flowchart that explains the processing of an exemplary embodiment of the present invention.

According to preferred exemplary embodiments, (a) a maximum area (S) of a power feeding line for the operating frequency (f0) of the LSI is derived based on design information of the circuit board (S3 in FIG. 4);

(b) an upper limit (Zt) of a power feeding line impedance, which is a power supply tolerance, is derived based on the design information of the circuit board (S4 in FIG. 4); and (c) for at least one setting frequency (f) that is equal to or lower than the operating frequency (f0) and is in a frequency range higher than the self resonant frequency (the self resonant frequency fb of a power feeding line having an area when the entire circuit board becomes the power feeding line) of a power feeding line having an area equivalent to an area of the circuit board, capacitors having the lowest resonant impedance and a resonant frequency close to the setting frequency are selected with reference to a capacitor characteristic database that stores capacitor characteristic information including at least resonant frequency and resonant impedance information of a capacitor, and the capacitors are installed as a number of high frequency decoupling capacitors, the number thereof corresponding to a value obtained by dividing the upper limit of the power feeding line impedance by the resonant impedance of the selected capacitor (S7 in FIG. 4).

According to preferred exemplary embodiments, in (c) above, (d) the setting frequency (f) may be set as the operating frequency (f0) (S6 in FIG. 4), capacitors having the lowest resonant impedance and a resonant frequency close to the setting frequency may be selected with reference to the capacitor characteristic database, and the capacitors may be installed as a number of high frequency decoupling capacitors, the number thereof corresponding to a value obtained by dividing the upper limit of the power feeding line impedance by the resonant impedance of the selected capacitor (S7 in FIG. 4);

(e) whether or not the setting frequency is higher than the self resonant frequency (fb) of the power feeding line having an area equivalent to an area of the circuit board may be determined (S8 in FIG. 4);

(f) a new setting frequency may be obtained by dividing the setting frequency (f) by a predetermined positive integer (S9 in FIG. 4) when the setting frequency is higher than the self resonant frequency of the power feeding line having an area equivalent to an area of the circuit board;

(g) a capacitor having the lowest resonant impedance and a resonant frequency close to the new setting frequency may be selected with reference to the capacitor characteristic database, and the capacitors may be installed as a number of high frequency decoupling capacitors, the number thereof corresponding to a value obtained by dividing the upper limit of the power feeding line impedance by the resonant impedance of the selected capacitor (S7 in FIG. 4), and the process may return to the judgment in (e) above (S8 in FIG. 4); and (f) and (g) above may be repeated until the setting frequency is lower than the self resonant frequency of the power feeding line having an area equivalent to an area of the circuit board in the judgment in (e) above (S8 in FIG. 4).

According to one of preferred exemplary embodiments, a plurality of the setting frequencies are set to frequencies at which anti-resonance does not occur among a plurality of capacitors, each of which selected corresponding to a different setting frequency in (c) above.

According to preferred exemplary embodiments, when the setting frequency (f) is not higher than the self resonant frequency (fb) of the power feeding line as a result of the judgment in (e) above (S8 in FIG. 4), (h) low frequency decoupling capacitors are installed on a power feeding line in a periphery of the power feeding line on which the one or more high frequency decoupling capacitors are installed (S10 in FIG. 4). According to a preferred exemplary embodiment, a slit (an insulating slit that electrically isolates the power feeding line on which the one or more high frequency decoupling capacitors are installed from the power feeding line on which the low frequency decoupling capacitors are installed) that cuts out a part of a conductive member of the power feeding line is provided between the power feeding line on which the one or more high frequency decoupling capacitors are installed and the power feeding line on which the low frequency decoupling capacitors are installed; and a power supply separation filter striding over the slit and connected to the power feeding line on which the one or more high frequency decoupling capacitors are installed and to the power feeding line on which the low frequency decoupling capacitors are installed is installed. The area of the power feeding line on which the one or more high frequency decoupling capacitors are installed is not more than the maximum area of the power feeding line derived in (a) above.

According to preferred exemplary embodiments, a maximum feed (S) for the operating frequency is derived by obtaining a power feeding area with the self resonant frequency as the operating frequency of the LSI in an arithmetic equation that derives the self resonant frequency of the power feeding line having an area equivalent to an area of the circuit board based on the design information of the circuit board in (a) above (S2 in FIG. 4). In other words, the power feeding line may be constituted by the power supply plane and the ground plane arranged in parallel, and the maximum power feeding area S for the operating frequency (f0) may be derived by obtaining the feed (S) using the following expression $$S=(C^2)/\{4\times(\pi^2)\times\varepsilon r\times(f0^2)\}$$

(where ^ indicates exponentiation), the above equation being derived by substituting the operating frequency f0 with fb and solving the power supply area S in an arithmetic equation:

$$fb=C\div\{2\pi\times\sqrt{(\varepsilon r\times S)}\}$$

(where S denotes the area of the power feeding line; ∈r the relative permittivity of an insulator between the power supply and ground planes; and C is a speed of light in vacuum) that derives the self resonant frequency fb of the power feeding line having an area equivalent to an area of the circuit board based on the design information of the circuit board in (a) above.

According to preferred exemplary embodiments, the design information includes a power supply voltage variation tolerance $\Delta v$ and a power supply current change value $\Delta i$, and the upper limit Zt of the power feeding line impedance is derived using a expression $Zt=\Delta v \div i$ in (b) above. The power supply current change value $\Delta i$ is a current value obtained by subtracting a minimum value of the power supply current from a maximum value and is expressed by the following expression using the power supply voltage v, the output impedance Ro of an output buffer of the power supply on the circuit board, the number N of the output buffers, and the characteristic impedance Z0 of a wiring connected to the output buffer $$\Delta i=v\div(Ro+Z0)\times N.$$

In (b) above, the upper limit Zt of the power feeding line impedance is derived using the following expression $$Zt = \Delta v \div \Delta i$$
$$= \Delta v \div \{v \div (Ro + Z0) \times N\}$$
$$= (Ro + Z0) \times rv \div N$$

(where $rv=\Delta v \div v$ denoting an allowable power variation rate). The following describes exemplary embodiments.

Exemplary Embodiment 1

FIG. 4 is a flowchart that explains a processing procedure of one of exemplary embodiments. One of exemplary embodiments will be described below with reference to FIGS. 4 to 13.

<Step S1: Extract Design Information>

As advance preparation, prepare design information 11 of a next LSI and board.

(1) Operating Frequency fo of the LSI

Prepare an operating frequency fo of the LSI. The operating frequency fo corresponds to a clock operating frequency, in the case where the LSI is a clock synchronization type.

(2) Allowable Power Variation Rate (Power Supply Voltage Variation Rate) rv

Generally, a power input range is read from an LSI specification data. Generally, it is indicated by $v\pm\Delta v$ (v is a center value of the power supply voltage, $\Delta v$ is a power supply voltage variation value (power supply tolerance)), and the allowable power variation rate rv is given by the following expression (1).

$$rv=\Delta v/v \quad (1)$$

In general, $V\pm\Delta V$, $5V\pm5\%$, and $5V\pm0.25V$, and in this case $$rv=0.25/5=0.05$$

(3) Power Supply Current Change Value $\Delta i$

A power supply current change rate $\Delta i$ is obtained by subtracting a minimum value of a power supply current from a maximum value thereof based on an LSI specification. Regarding an I/O power supply (power supply connected to an external bus interface of a CPU), it is expressed by the following expression (2) using an output impedance Ro of an output buffer, the number N of the output buffers, and a characteristic impedance Z0 of a wiring connected to the output buffer.

$$\Delta i = v \div (Ro+Z0) \times N \quad (2)$$

(4) Circuit Board Area Sb

An area of a printed circuit board or a maximum area in which a power feeding line can be wired. In examples in FIG. 1 or FIG. 11 (described later), $$S = A \times B \quad (3)$$

Figure 11:
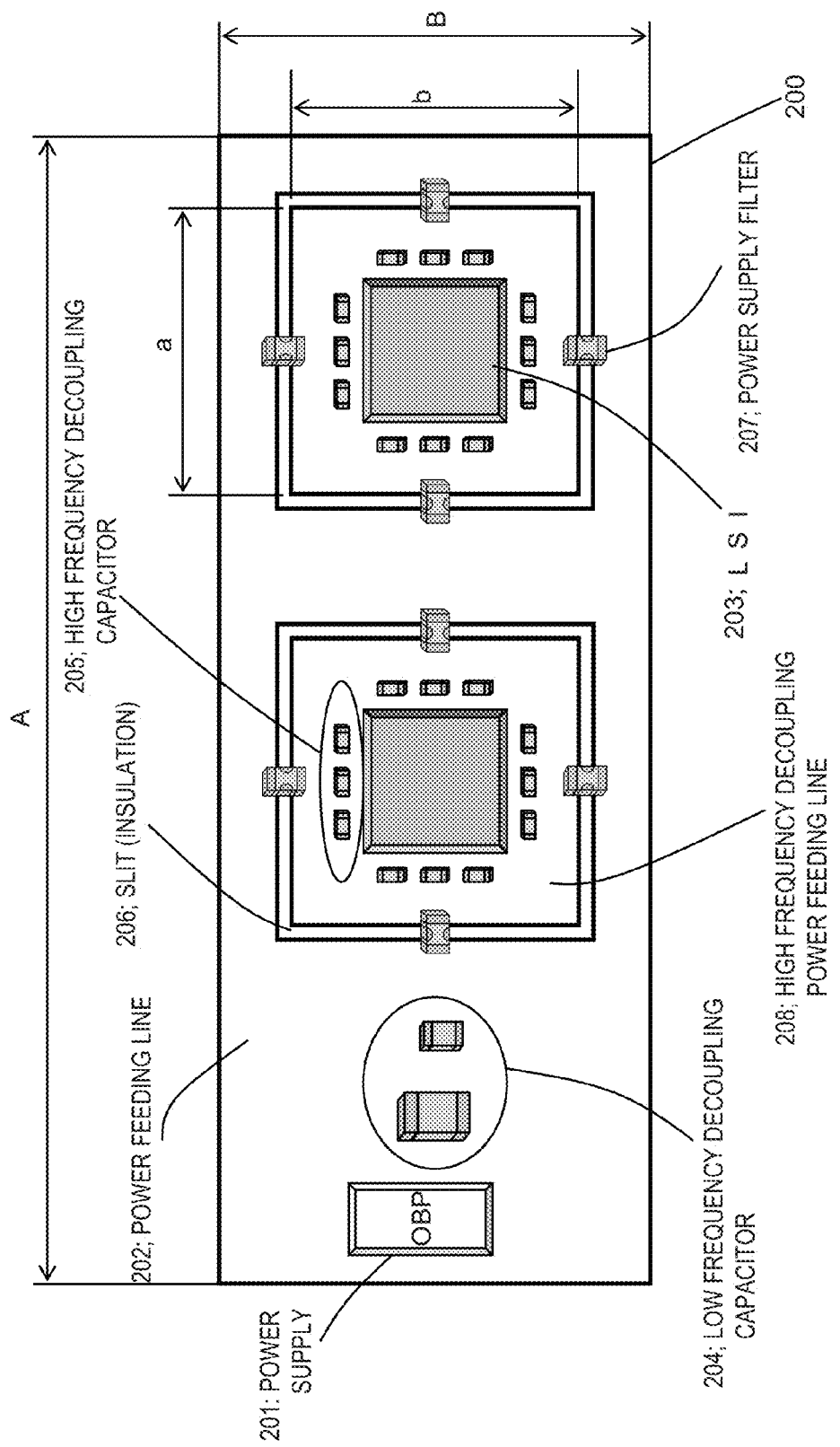
FIG. 11 is a diagram showing a power feeding line of an exemplary embodiment.

Note that FIG. 11 is a diagram schematically illustrating a circuit board designed and manufactured according to the procedure of the present exemplary embodiment.

<Step S2: Calculate a Self Resonant Frequency fb that a Board Area Has>

Derive a self resonant frequency fmax of the power feeding line, in the case where an entire board (the entirety of the circuit board 100 or 200 in FIG. 1 or 11) is set to an area for the power feeding line.

Figure 5:
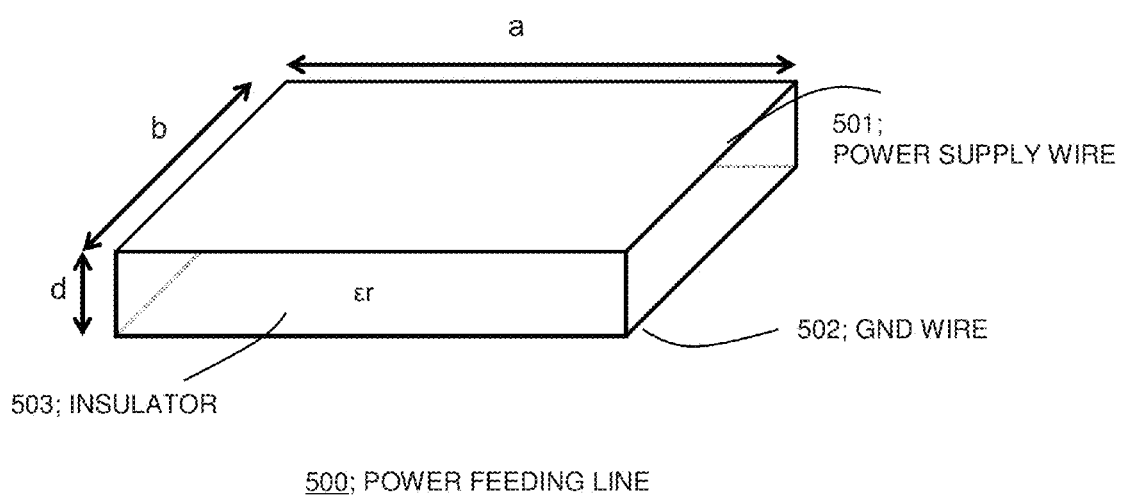
FIG. 5 is a diagram explaining a power feeding line.

FIG. 5 shows a simplified power feeding line, which is an equivalent of a parallel plate capacitor. The power feeding line 500 comprises a power supply wire (power supply plane) 501 and a GND wire (GND plane) 502 (a parallel plate electrode of the parallel plate capacitor), and further comprises an insulator (dielectric) 503 therebetween. The parallel plate electrode is oppositely arranged a distance d away and is a rectangle with a horizontal length of a and a vertical length of b. The capacitance Cb of the parallel plate capacitor is given by the following expression (4).

$$Cb = \in r \times \in 0 \times a \times b \div d \quad (4)$$

where $\in r$: a relative dielectric constant of the insulator 503
$\in 0$: dielectric constant of vacuum.

Further, when the shape in FIG. 5 is regarded as parallel lines having a width (the width of the power supply path) of b and a length (the length of the power supply path) of a, an electrostatic induction Lb is given by the following expression (5).

$$Lb = \mu 0 \times a \times d \div b \quad (5)$$

Where $\mu 0$: permeability of vacuum.

Therefore, the self resonant frequency fb of the power feeding line (LC circuit) shown in FIG. 5 is given by the following expression (6).

$$fb = 1 \div \{2\pi \times \sqrt{(Lb \times Cb)}\} \quad (6)$$
$$= 1 \div \{2\pi \times a \times \sqrt{(\varepsilon r \times \varepsilon 0 \times \mu 0)}\}$$
$$= C \div \{2\pi \times a \times \sqrt{(\varepsilon r)}\}$$

where $C=1/\sqrt{(\in 0 \times \mu 0)}$ is the speed of light in vacuum.

Figure 6:
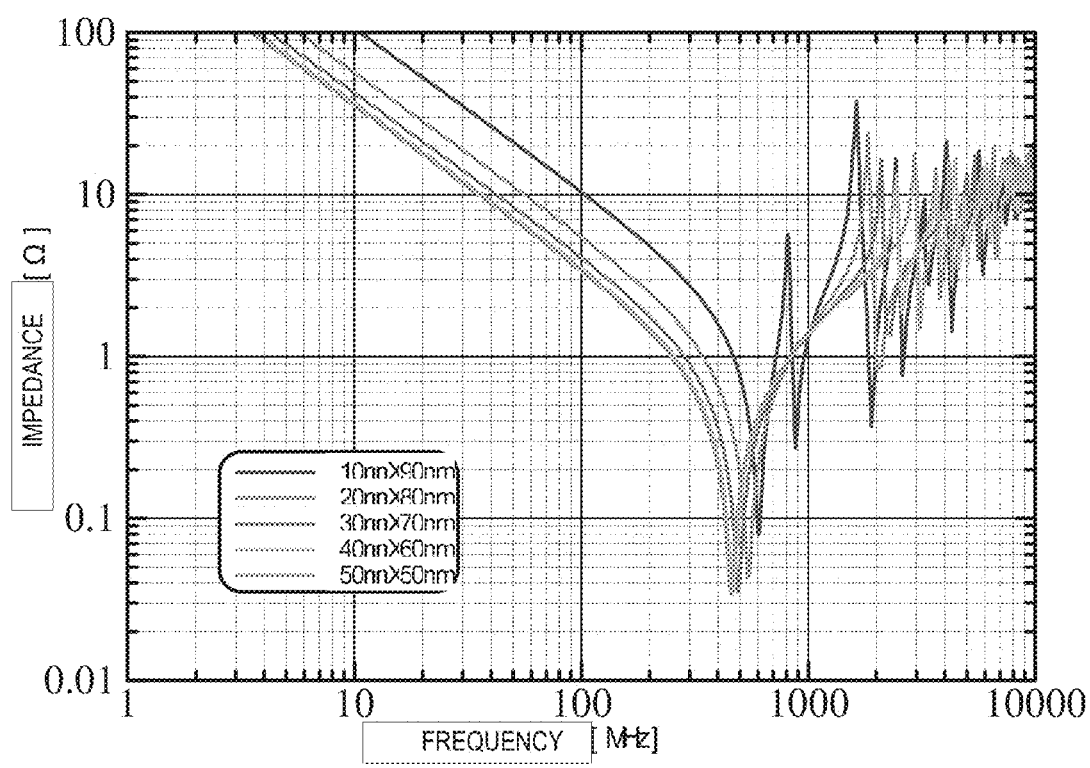
FIG. 6 is a diagram showing an analysis of resonant frequency characteristics by an aspect ratio between a and b.

FIG. 6 is a diagram showing an analysis of the resonant frequency characteristics by the aspect ratio between a and b. Further, FIG. 7 shows the differences between the results of the analysis of the power feeding line impedance (refer to FIG. 6) and the expression (6) above.

According to these results, by replacing the parameter a with a geometric mean of a and b ($\sqrt{(a \times b)}$), it is possible to achieve an approximation even with an aspect ratio of about 0.2 to 0.4

A expression wherein the expression (6) is extended by replacing a with $\sqrt{(a \times b)}$ is the following expression (7).

$$fb = C \div \{2\pi \sqrt{(\varepsilon r \times a \times b)}\} \quad (7)$$
$$= C \div \{2\pi \sqrt{(\varepsilon r \times S)}\}$$

where
$S = a \times b$ and
S is the area of the power feeding line.

Figure 8:
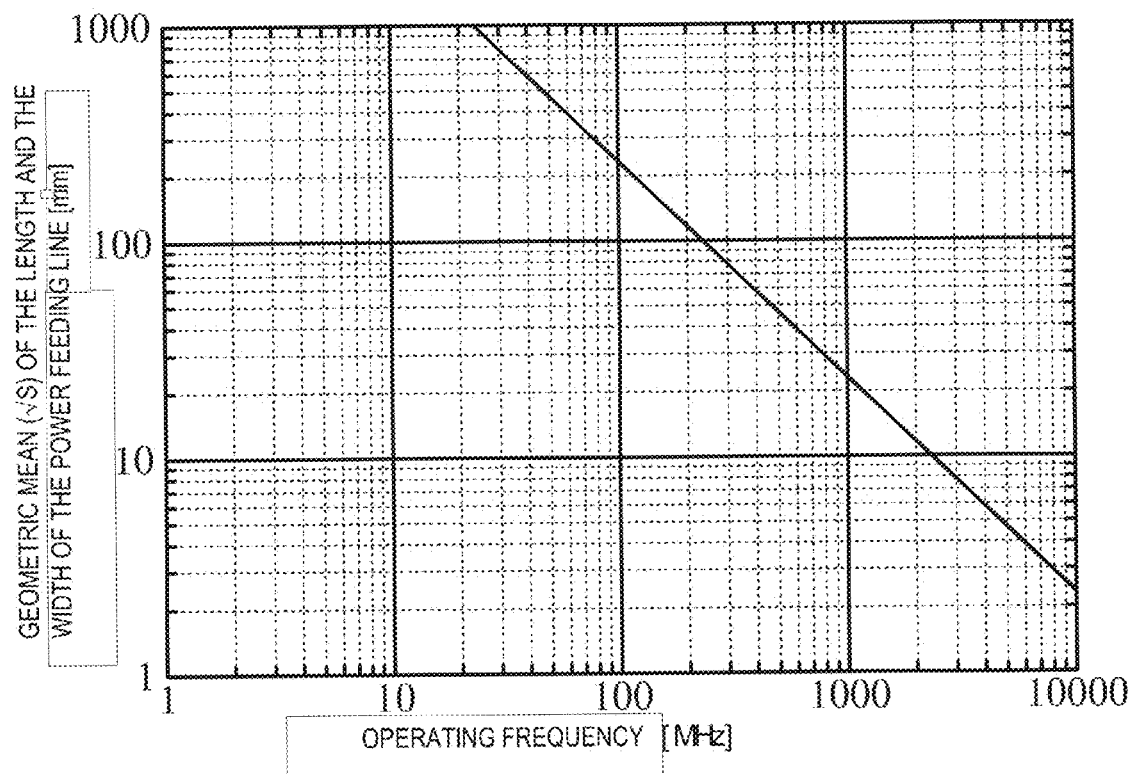
FIG. 8 is a diagram showing the results of plotting a expression (7).

FIG. 8 is obtained by plotting the expression (7). An abscissa indicates a frequency (operating frequency) in a logarithmic scale, and an ordinate indicates a geometric mean of the length and width of the power supply path ($\sqrt{S}$) in a logarithmic scale.

<Step S3: Calculate a Maximum Power Feeding Area S>

When the power feeding line area S is obtained with the self resonant frequency fb in the expression (7) as the operating frequency fo of the LSI, the maximum feeding area S for the operating frequency fo can be derived by the following equation (8).

$$S = (C^2) \div \{(4 \times (\pi^2) \times \in r \times (fo^2))\} \quad (8)$$

(where ^ indicates exponentiation.)

The example in FIG. 11 should be designed so that the relation between the maximum power feeding area S of the power feeding line (high frequency decoupling power feeding line), where high frequency decoupling of the LSI 203 is performed, and the area a×b of the power feeding line where high frequency decoupling is performed is as follows.

$$S \geq a \times b \quad (9)$$

<Step S4: Calculate a Target Impedance Zt>

A target impedance Zt, which is an upper limit of the power feeding line impedance that keeps the power supply variation equal to or less than Δv, is derived. Since a voltage drop occurring when the power supply current Δi flows through the target impedance Zt should be equal to or less than Δv, an upper limit of the power feeding line impedance (target impedance) is given by the following expression (10).

$$\begin{aligned} Zt &= \Delta v \div \Delta i \\ &= \Delta v \div \{v \div (Ro + Z0) \times N\} \\ &= (Ro + Z0) \times rv \div N \end{aligned} \quad (10)$$

<Step S5: Read a Capacitor Characteristic>

Figure 9:
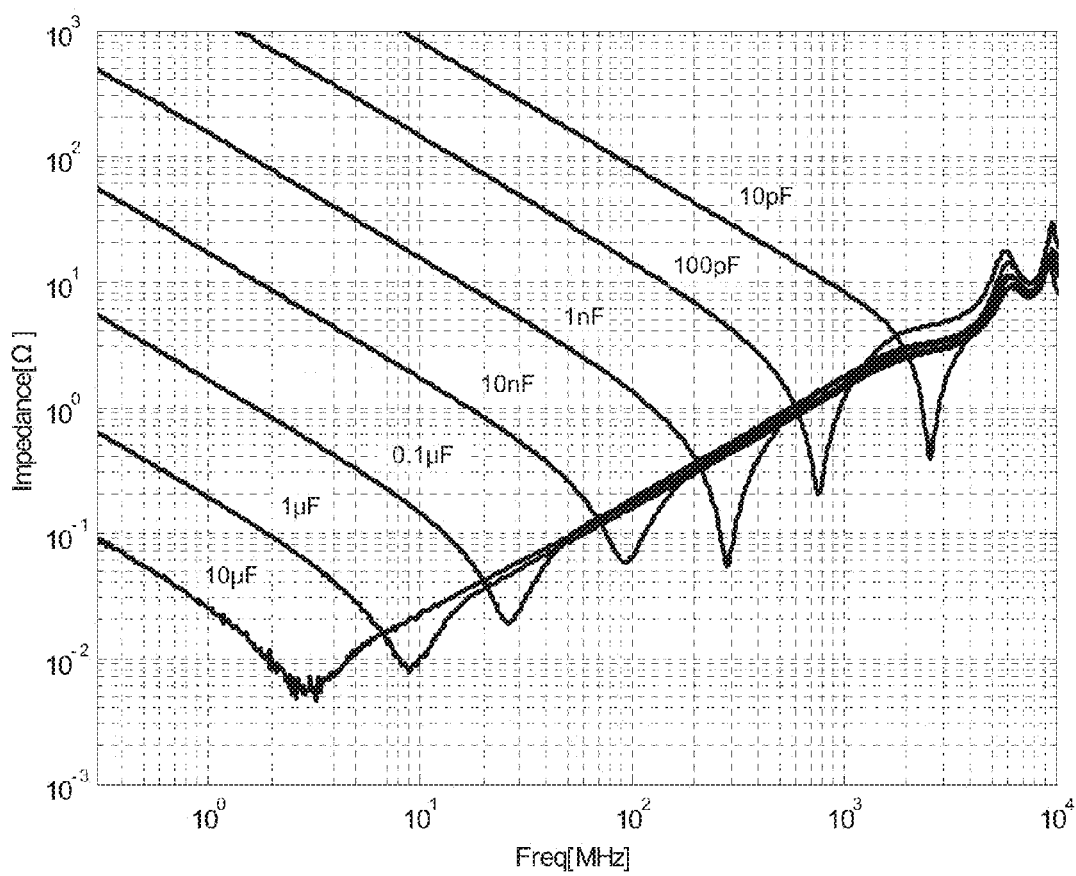
FIG. 9 is a diagram showing an example of an impedance frequency characteristic of a general ceramic capacitor.

Generally, an impedance frequency characteristic of a ceramic capacitor curves as shown in FIG. 9. Note that a resonant frequency and an impedance at resonance vary, depending on a capacitance.

Therefore, in a capacitor characteristic database 12 in FIG. 4, a capacitance (unit: F), a resonant frequency (unit: Hz) of a capacitor, and a resonant impedance Zc (unit: Ω) of a capacitor are prepared as database information. An image of information storage of the capacitor characteristic database 12 is illustrated in FIG. 10.

<Select a Capacitor>

Steps S6 to S10 in FIG. 4 show a flow in which a capacitor for high frequency suppression (high frequency decoupling capacitor) is selected.

<Step S6> f is set as an operating frequency of the LSI in setting information 11.

$$f = fo \text{ (operating frequency of LSI)} \quad (11)$$

<Step S7>

Select a capacitor having the lowest resonant impedance Zc and a resonant frequency close to the frequency f based on capacitor information stored in the capacitor characteristic database 12. The quantity (the number) of the capacitors is equal to or more than $$Zt \div Zc \quad (12).$$

<Step S8>

Next, it is determined whether or not f>fb holds, and if it does not ("No" in the step S8, i.e., f≤fb), there is no need to install any more high frequency decoupling capacitors. Therefore, when f≤fb, the processing proceeds to the next process (the step S10).

If f>fb, the processing proceeds to the step S9.

<Step S9>

Assuming that m is any positive number, $$f \leftarrow f \div m \quad (13),$$

the processing returns to the step S6, wherein similarly a capacitor having the lowest resonant impedance Zc and a resonant frequency close to the frequency f is selected based on the capacitor characteristic database (12 in FIG. 4). At this time, capacitors are installed, the number thereof being Zt÷Zc or more.

In the case wherein two capacitors (resonant circuits) having different self resonant frequencies are connected in parallel, there may occur an anti-resonance (parallel resonance), in which a resonance occurs at an intermediate resonant frequency between the two self resonant frequencies to increase the impedance. Therefore, when a plurality of capacitors are connected in parallel, it is necessary to determine a capacitance value or the like in consideration of a self resonant frequency and an anti-resonant frequency of a capacitor.

In the present exemplary embodiment, a difference between f and f÷m is adjusted. Roughly speaking, when m is about two to four, there are approximately two to five points of resonant frequencies within a tenfold multiplication of a frequency. As a result, anti-resonance can be prevented.

Again, it is determined whether or not f>fb holds in the step S8, and the same process is repeated until f≤fb holds. In the processing of the steps S7 to S9, high frequency decoupling capacitors are installed in a high frequency decoupling power feeding line (208 in FIG. 11; the maximum area S thereof is determined in the step S3).

<Step S10: Install a Low Frequency Capacitor and a Power Supply Separation Filter>

A low frequency decoupling capacitor (204 in FIG. 11) of several μF to several tens of μF is installed. Since the capacitor of this capacitance has a resonance impedance Zc sufficiently small, several capacitors are enough. Further, as in the selection of the high frequency decoupling capacitors, the number of the low frequency decoupling capacitors may be determined using the following expression.

$$Zt \div Zc$$

(where Zt is a target impedance and Zc is a resonant impedance of the low frequency decoupling capacitor.)

The area of the power feeding line (an area (a×b) of the high frequency decoupling power feeding line 208 in FIG. 11) must be smaller than the maximum power feeding area S derived in the step S3 (refer to the equation (9)) and is connected to a surrounding power feeding line 102 (202) via a resistor, inductor, and feed-through capacitor (three-terminal capacitor). At this time, a power supply current flows through the resistor, inductor and feed-through capacitor. Therefore, a voltage drop and current resistance must be taken into account.

<Design Example of a Power Feeding Line>

FIG. 11 is a diagram illustrating an example of a circuit board of the present exemplary embodiment. The power feeding line having the configuration shown in FIG. 11 can be designed according to the flow described above. The high frequency decoupling power feeding line 208 is provided corresponding to each of the two LSIs 203. A plurality of the high frequency decoupling capacitors 205 are provided surrounding the LSI 203 near the LSI 203, for each high frequency decoupling power feeding line 208, and these capacitors 204 are connected in parallel between the power supply and GND. A slit 206 (space created by cutting out a conductor of the power supply/ground plane) is provided between the outer circumference of the high frequency decoupling power feeding line 208 and the power feeding line 202. The power supply separation filter (power supply filter) 207 connected to the power feeding line 202 and the high frequency decoupling power feeding line 208 is provided, striding over the slit 206 so as to separate the high frequency decoupling power feeding line 208 inside the slit 206 from the power feeding line 202 outside. As in FIG. 1, the power supply 201 and the low frequency decoupling capacitors 204 are provided for the power feeding line 202 corresponding to the board 200.

Figure 12:
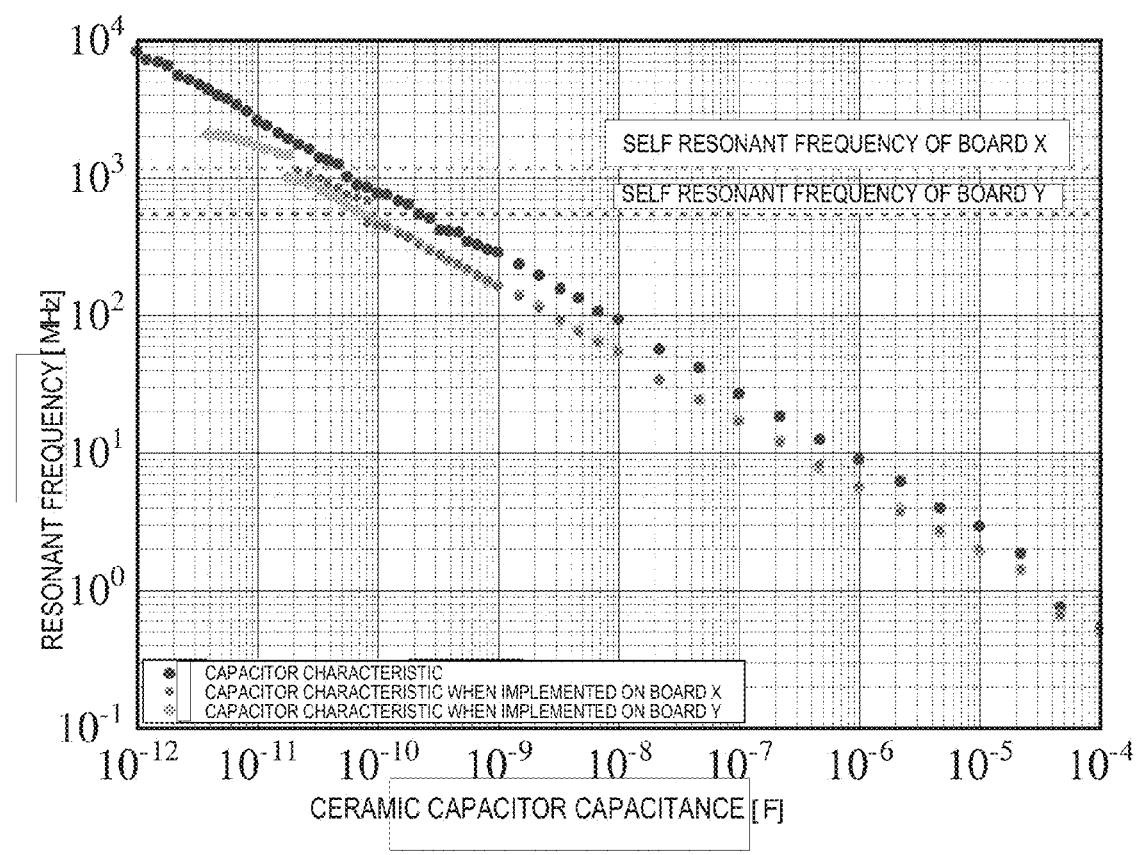
FIG. 12 is a diagram showing the relation between the self resonant frequency and the capacitance of two types of planar shaped square power feeding lines (Boards X and Y) having different sizes on which a ceramic capacitor is installed.

FIG. 12 plots a self resonant frequency of a capacitor alone, a self resonant frequency (an ordinate) of two types of planar shaped square shaped power feeding lines (Boards X and Y) having different sizes on which a ceramic capacitor is installed, with a capacitance on an abscissa. Further, FIG. 13 shows an impedance characteristic at resonance under the same condition.

Figure 13:
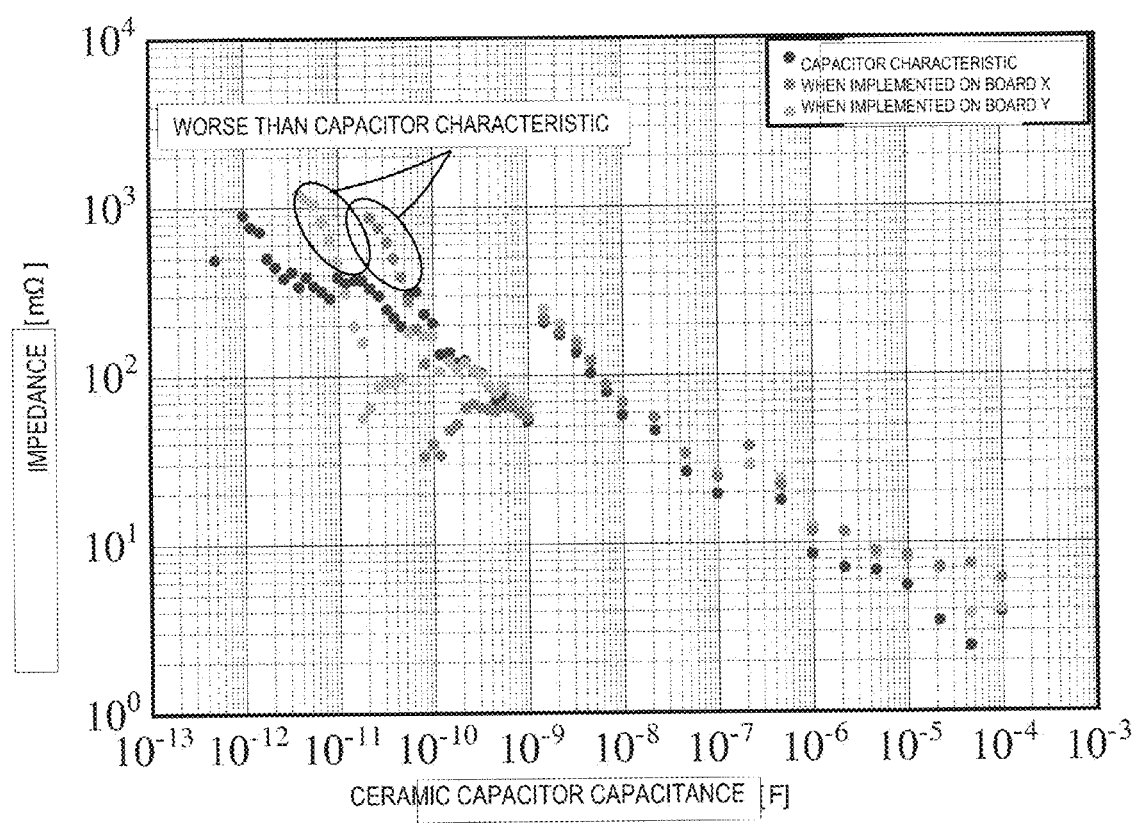
FIG. 13 is a diagram showing the impedance characteristics at resonance of two types of planar shaped square power feeding lines (Boards X and Y) having different sizes on which a ceramic capacitor is installed.

As shown in the graph in FIG. 9, the self resonant frequency draw V-shaped curves being convex downward, and FIGS. 12 and 13 plot the frequency and the impedance at the peaks of the "V"s for each capacitance.

As shown in FIG. 12, in the capacitor stand-alone characteristic, the self resonant frequency has a characteristic to decrease at a nearly constant rate as the capacitance increases.

However, once the capacitor is installed on the power feeding line, the characteristics become discontinuous, influenced by the self resonant frequency of the power feeding line itself.

As shown in FIG. 13, when a capacitor having a self resonant frequency higher than the self resonant frequency of the power feeding line is installed, the impedance at resonance becomes higher than the impedance of the capacitor itself. This indicates that a capacitor having a self resonant frequency higher than the self resonant frequency of the power feeding line does not contribute to decoupling.

According to the present exemplary embodiment, by designing a power feeding line according to the flow shown in FIG. 4, the power feeding line region (area) is designed within a region below the curve (the operating frequency and the geometric mean (S) of the length and the width of the power feeding line) shown in FIG. 8, and since it is possible to select capacitors (high frequency decoupling capacitors) having decoupling effects within this area, efficient decoupling can be achieved.

As described above, according to the present exemplary embodiment, a region of the power feeding line corresponding to an operating frequency of an LSI is prescribed. Therefore, a characteristic of a capacitor having a required resonant frequency can be utilized. As a result, a decoupling effect can be efficiently obtained.

Further, according to the present exemplary embodiment, a condition for installing a power feeding line is taken into account in at a circuit design stage. Therefore, by designing a layout according to the installation condition, the need for a verification process such as a simulation of the power supply system is eliminated. As a result, a secondary effect of reducing a development process can be obtained.

Figure 1:
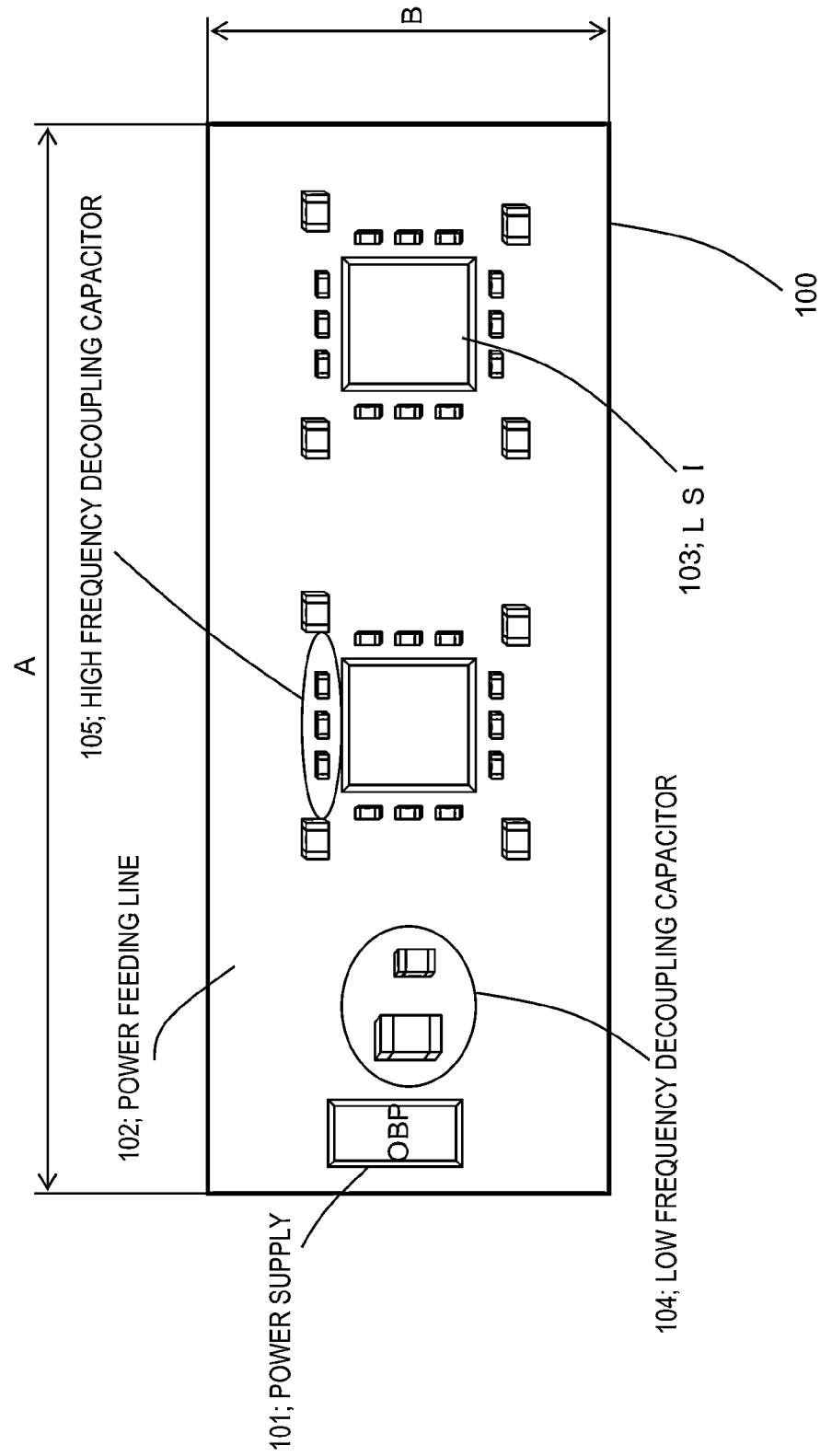
FIG. 1 is a diagram for explaining an example (prototype) of a decoupling technology in a power feeding line.
Figure 2:
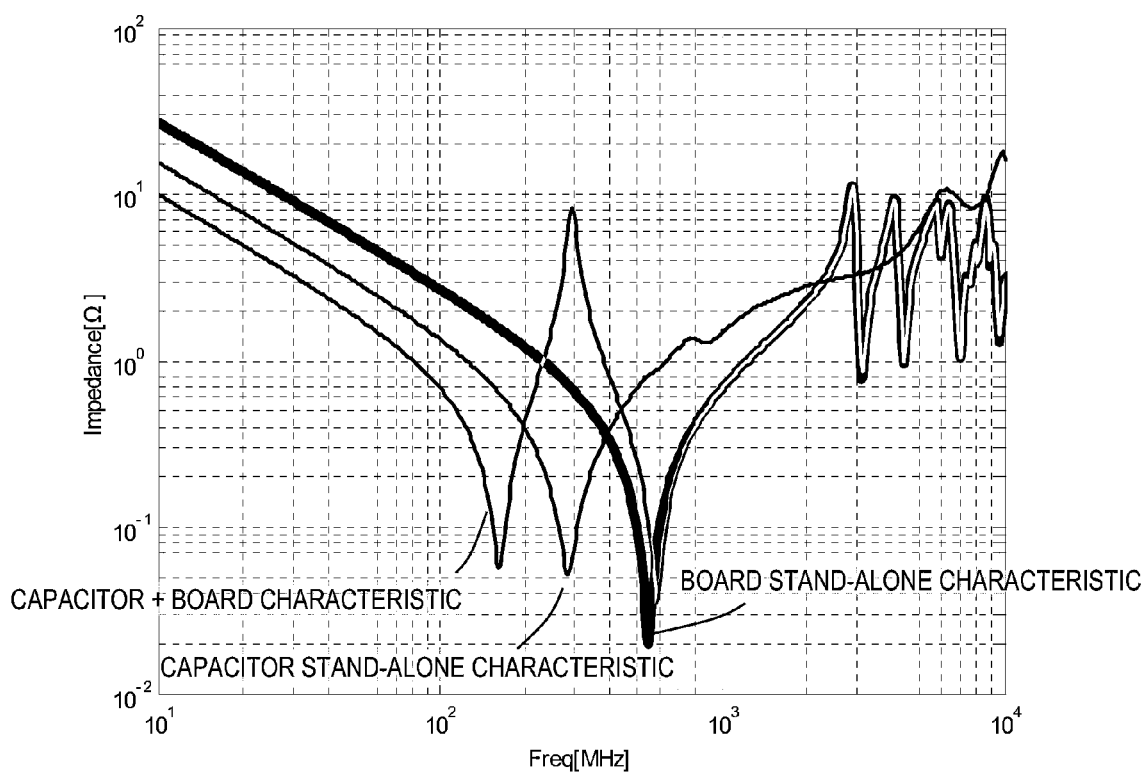
FIG. 2 is a diagram showing a decoupling effect (board alone, capacitor alone, and capacitor+board characteristics).
Figure 3:
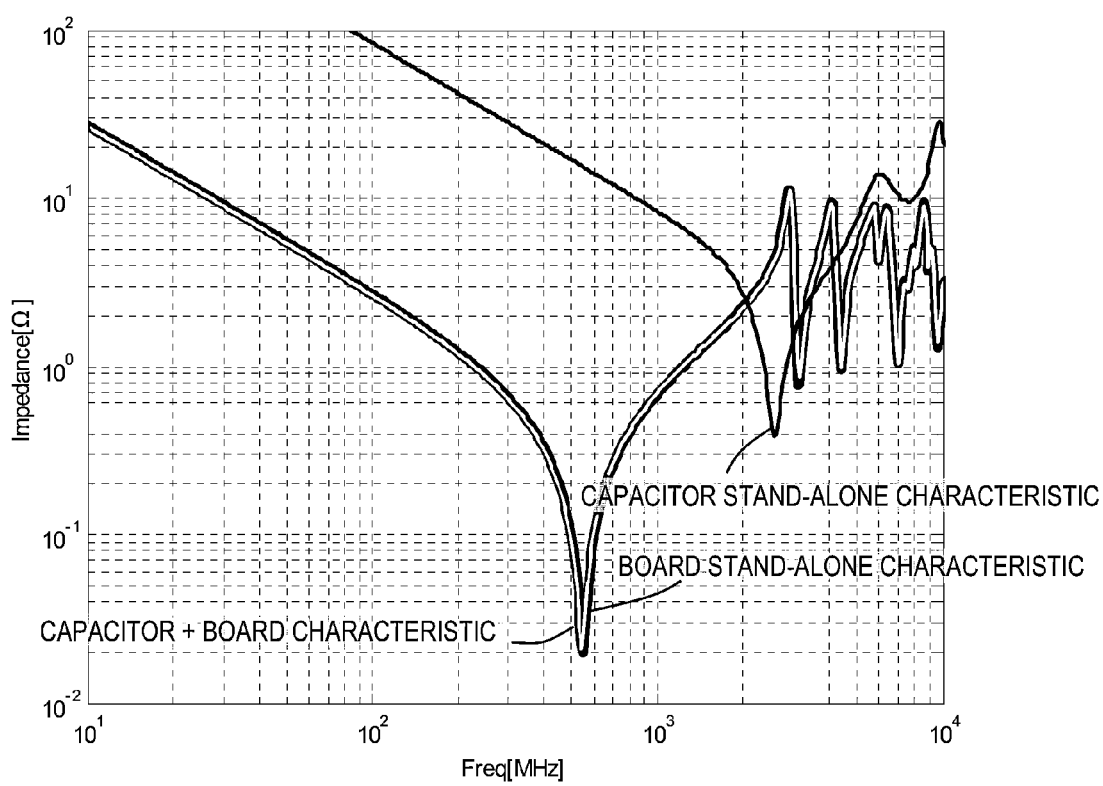
FIG. 3 is a diagram showing characteristics (board alone, capacitor alone, capacitor+board characteristics) when a capacitor having a self resonant frequency higher than a self resonant frequency of the board alone is installed.

Further, in the example in FIG. 1, the present exemplary embodiment is also effective in the case where an area (A×B) of the circuit board is in a region below the characteristic (curve) shown in FIG. 8.

Exemplary Embodiment 2

Figure 14:
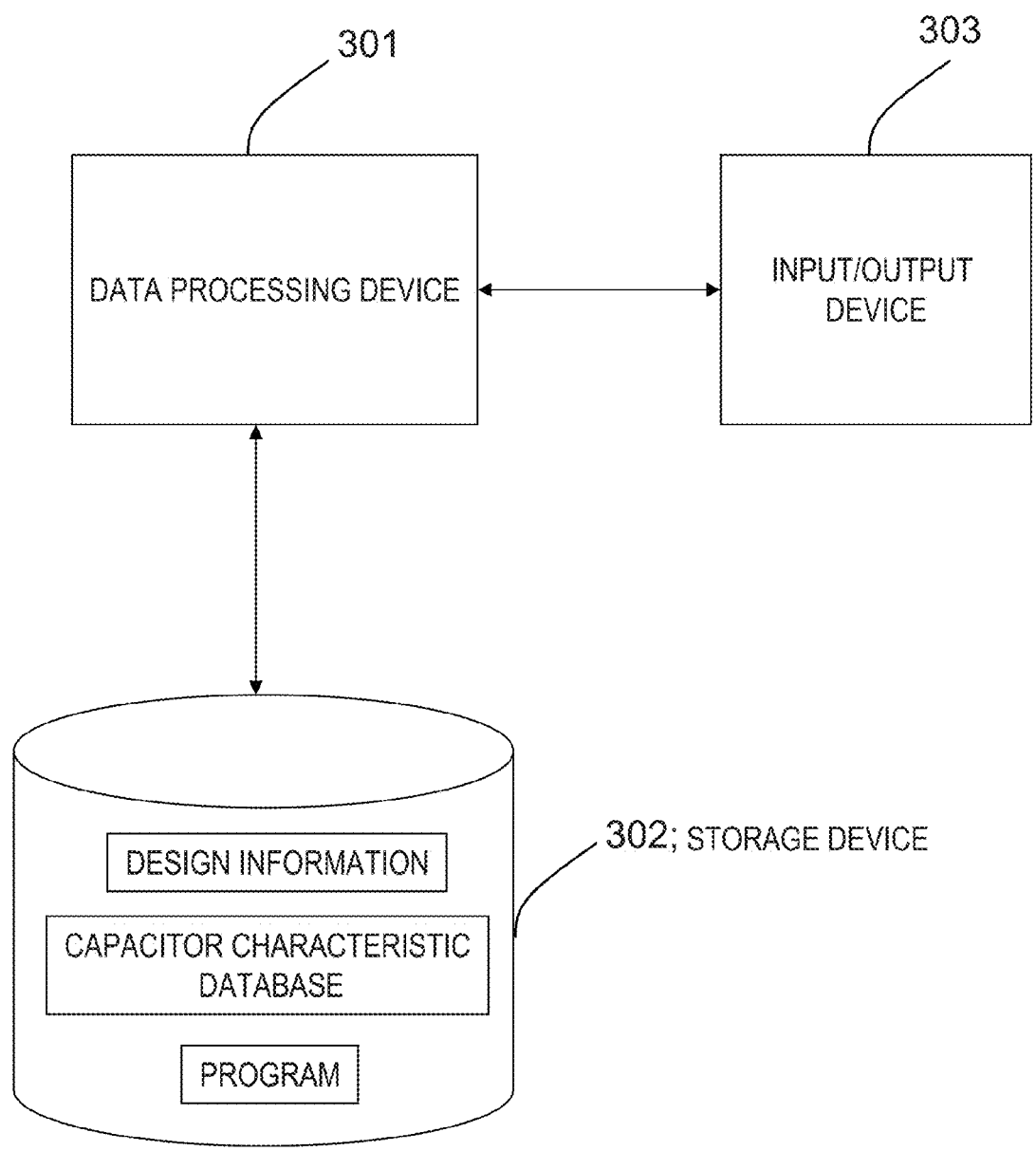
FIG. 14 is a diagram showing an example of a designing apparatus.

It is noted that each step in FIG. 4 may be realized by a program executed by a data processing apparatus (computer) 301, as shown in FIG. 14. For instance, the program stored in a storage apparatus 302 such as an HDD (Hard Disk Drive) is read to and executed by the data processing apparatus (computer) 301. The design information 11 and the capacitor characteristic database 12 in FIG. 4 are stored in, for instance, the storage apparatus 302 (a plurality of the storage apparatuses 302 may be provided so that they are stored in separate storage apparatuses) and read to the data processing apparatus (computer) 301, each step is executed, and each calculation result is suitably outputted to an input/output apparatus 303 such as a terminal. The data processing apparatus (computer) 301 in FIG. 14 functions as a power feeding line design apparatus (circuit board design apparatus) that efficiently enables decoupling using the design information of the circuit board and the capacitor characteristic database.

Part or all of the exemplary embodiments above can be described as following Supplementary notes, though not limited thereto.

(Supplementary Note 1)

A decoupling method that performs decoupling for a circuit board having an LSI mounted thereon using a data processing apparatus, the method comprising:

(a) deriving a maximum area of a power feeding line for an operating frequency of the LSI based on design information of the circuit board;

(b) deriving an upper limit of a power feeding line impedance, which is a power supply tolerance, based on the design information of the circuit board; and (c) for at least one setting frequency that is equal to or lower than the operating frequency and is in a frequency range higher than a self resonant frequency of a power feeding line having an area equivalent to an area of the circuit board, selecting a capacitor having the lowest resonant impedance and a resonant frequency close to the setting frequency, with reference to a capacitor characteristic database that stores capacitor characteristic information including at least resonant frequency and resonant impedance information of a capacitor, and installing one or more capacitors, each being the selected capacitor, as high frequency decoupling capacitors, the number thereof corresponding to a value obtained by dividing the upper limit of the power feeding line impedance by the resonant impedance of the selected capacitor.

(Supplementary Note 2)

The decoupling method according to Supplementary Note 1, wherein the (c) comprises:

(d) setting the setting frequency as the operating frequency, selecting a capacitor having the lowest resonant impedance and a resonant frequency close to the setting frequency with reference to the capacitor characteristic database, and installing one or more capacitors, each being the selected capacitor, as high frequency decoupling capacitors, the number thereof corresponding to a value obtained by dividing the upper limit of the power feeding line impedance by the resonant impedance of the selected capacitor;

(e) judging whether or not the setting frequency is higher than the self resonant frequency of the power feeding line having an area equivalent to an area of the circuit board;

(f) obtaining a new setting frequency by dividing the setting frequency by a predetermined positive integer when the setting frequency is higher than the self resonant frequency of the power feeding line having an area equivalent to an area of the circuit board;

(g) selecting a capacitor having the lowest resonant impedance and a resonant frequency close to the new setting frequency with reference to the capacitor characteristic database, installing one or more capacitors, each being the selected capacitor, as high frequency decoupling capacitors, the number thereof corresponding to a value obtained by dividing the upper limit of the power feeding line impedance by the resonant impedance of the selected capacitor, and returning to the judgment in (e) above; and repeating (f) and (g) above until the setting frequency is lower than the self resonant frequency of the power feeding line having an area equivalent to an area of the circuit board in the judgment in (e) above.

(Supplementary Note 3)

The decoupling method according to Supplementary Note 1 or 2, wherein the (c) comprises:

setting a plurality of the setting frequencies to frequencies at which anti-resonance does not occur among a plurality of capacitors, each being selected corresponding to one of the setting frequencies different to each other.

(Supplementary Note 4)

The decoupling method according to Supplementary Note 1 or 2, wherein the design information includes:

the operating frequency of the LSI;

an allowable power supply voltage variation rate $rv=\Delta v/v$ ($\Delta v$ is a power supply voltage variation value; v is a power supply voltage);

a power supply current change value $\Delta i$ $$\Delta i = v \div (Ro+Z0) \times N$$

(v: the power supply voltage; Ro: an output impedance of an output buffer of the power supply; N: the number of the output buffers; Z0: a characteristic impedance of a wiring connected to the output buffer); and a board area Sb.

(Supplementary Note 5)

The decoupling method according to Supplementary Note 2, comprising:

(h) installing one or more low frequency decoupling capacitors on a power feeding line in a periphery of the power feeding line, on which the one or more high frequency decoupling capacitors are installed, in the case wherein the setting frequency is not higher than the self resonant frequency of the power feeding line, as a judgment result of the (e).

(Supplementary Note 6)

The decoupling method according to Supplementary Note 5, comprising:

providing a slit that cuts out a part of a conductive member of the power feeding line between the power feeding line on which the one or more high frequency decoupling capacitors are installed and the power feeding line on which the one or more low frequency decoupling capacitors are installed; and installing a power supply separation filter striding over the slit and connected to the power feeding line on which the one or more high frequency decoupling capacitors are installed and to the power feeding line on which the low frequency decoupling capacitors are installed.

(Supplementary Note 7)

The decoupling method according to Supplementary Note 6, wherein the area of the power feeding line on which the one or more high frequency decoupling capacitors are installed is not more than the maximum area of the power feeding line derived in the (a).

(Supplementary Note 8)

The decoupling method according to Supplementary Note 1 or 2, wherein the (a) comprises:

deriving the maximum area of the power feeding line for the operating frequency by obtaining a power feeding area with the self resonant frequency as the operating frequency of the LSI in an arithmetic equation that derives the self resonant frequency of the power feeding line having an area equivalent to an area of the circuit board, based on the design information of the circuit board.

(Supplementary Note 9)

The decoupling method according to Supplementary Note 8, wherein the power feeding line is constituted by the power supply plane and the ground plane arranged in parallel, and wherein the (a) comprises deriving a maximum power feeding area S for the operating frequency f0 by obtaining a power supply feeding area (S) using the following expression:

$$S = (C^2) / \{4 \times (\pi^2) \times \in r \times (f0^2)\}$$

(where ^ indicates exponentiation), the above equation being derived by substituting the operating frequency f0 with fb and solving the power supply area S in an arithmetic equation:

$$fb = C \div \{2\pi \times (\in r \times S)\}$$

(where S is an area of the power feeding line; $\in r$ is a relative dielectric constant of an insulator between power supply and ground planes; and C is a speed of light in vacuum)

that derives the self resonant frequency (fb) of the power feeding line having an area equivalent to an area of the circuit board based on the design information of the circuit board in (a) above.

(Supplementary Note 10)

The decoupling method according to Supplementary Note 1 or 2, wherein the design information includes the allowable power supply voltage variation value $\Delta v$ and the power supply current change value $\Delta i$, and wherein the method comprises deriving the upper limit Zt of the power feeding line impedance using the following expression $$Zt = \Delta v \div \Delta i.$$

(Supplementary Note 11)

The decoupling method according to Supplementary Note 10, wherein the power supply current change value $\Delta i$ is a current value obtained by subtracting a minimum value of the power supply current from a maximum value and is expressed by the following expression using the center value v of the power supply voltage, the output impedance Ro of the output buffer of the power supply, the number N of the output buffers, and the characteristic impedance Z0 of the wiring connected to the output buffer $$\Delta i = v \div (Ro+Z0) \times N,$$

and wherein the (b) comprises deriving the upper limit Zt of the power feeding line impedance using the following expression with $\Delta v$ denoting the allowable power supply voltage variation value and $\Delta i$ the power supply current change value in (b) above $$Zt = \Delta v \div \Delta i$$
$$= \Delta v \div \{v \div (Ro+Z0) \times N\}$$
$$= (Ro+Z0) \times rv \div N$$

(where $rv = \Delta v \div v$, being the allowable power variation rate).

(Supplementary Note 12)

An apparatus for designing power feeding line that performs decoupling for a circuit board having an LSI mounted thereon, the apparatus comprising:

a capacitor characteristic database that stores a capacitance value of a capacitor associated with a resonant frequency thereof; and means for executing the following steps (a) to (c):

(a) deriving a maximum area of a power feeding line for an operating frequency of the LSI based on design information of the circuit board;

(b) deriving an upper limit of a power feeding line impedance, which is a power supply tolerance, based on the design information of the circuit board; and (c) for at least one setting frequency that is equal to or lower than the operating frequency and is in a frequency range higher than the self resonant frequency of a power feeding line having an area equivalent to an area of the circuit board, selecting a capacitor having the lowest resonant impedance and a resonant frequency close to the setting frequency with reference to the capacitor characteristic database that stores capacitor characteristic information including at least resonant frequency and resonant impedance information of a capacitor, and arranging on the power feeding line, one or more capacitors, each being the selected capacitor, as high frequency decoupling capacitors, the number thereof corresponding to a value obtained by dividing the upper limit of the power feeding line impedance by the resonant impedance of the selected capacitor.

(Supplementary Note 13)

The apparatus for designing power feeding line according to Supplementary Note 12, wherein the (c) comprises:

(d) setting the setting frequency as the operating frequency, selecting a capacitor having the lowest resonant impedance and a resonant frequency close to the setting frequency with reference to the capacitor characteristic database, and disposing on the power feeding line, one or more capacitors, each being the selected capacitor, as high frequency decoupling capacitors, the number thereof corresponding to a value obtained by dividing the upper limit of the power feeding line impedance by the resonant impedance of the selected capacitor;

(e) judging whether or not the setting frequency is higher than the self resonant frequency of the power feeding line having an area equivalent to an area of the circuit board;

(f) obtaining a new setting frequency by dividing the setting frequency by a predetermined positive integer in the case wherein the setting frequency is higher than the self resonant frequency of the power feeding line having an area equivalent to an area of the circuit board;

(g) selecting a capacitor having the lowest resonant impedance and a resonant frequency close to the new setting frequency with reference to the capacitor characteristic database, disposing on the power feeding line, one or more capacitors, each being the selected capacitor, as high frequency decoupling capacitors, the number thereof corresponding to a value obtained by dividing the upper limit of the power feeding line impedance by the resonant impedance of the selected capacitor, and returning to the judgment in (e) above; and repeating (f) and (g) above until the setting frequency is lower than the self resonant frequency of the power feeding line having an area equivalent to an area of the circuit board in the judgment in (e) above.

(Supplementary Note 14)

The apparatus for designing power feeding line according to Supplementary Note 12 or 13, wherein the (c) comprises setting a plurality of the setting frequencies to frequencies at which anti-resonance does not occur among a plurality of capacitors, each of which selected corresponding to a different setting frequency.

(Supplementary Note 15)

The apparatus for designing power feeding line according to Supplementary Note 12 or 13, wherein the design information includes:

the operating frequency of the LSI;

an allowable power supply voltage variation rate $rv=\Delta v/v$ ($\Delta v$ is a power supply voltage variation value; v is a power supply voltage);

a power supply current change value $\Delta i$ $$\Delta i = v \div (Ro+Z0) \times N$$

(v: the power supply voltage; Ro: an output impedance of an output buffer of the power supply; N: the number of the output buffers; Z0: a characteristic impedance of a wiring connected to the output buffer); and a board area Sb.

(Supplementary Note 16)

The apparatus for designing power feeding line according to Supplementary Note 13, comprising (h) disposing low frequency decoupling capacitors on a power feeding line in a periphery of the power feeding line on which the one or more high frequency decoupling capacitors are installed when the setting frequency is not higher than the self resonant frequency of the power feeding line, as a result of the judgment of the (e).

(Supplementary Note 17)

The apparatus for designing power feeding line according to Supplementary Note 16, comprising providing a slit that cuts out a part of a conductive member of the power feeding line between the power feeding line on which the one or more high frequency decoupling capacitors are installed and the power feeding line on which the low frequency decoupling capacitors are installed, and disposing a power supply separation filter striding over the slit and connected to the power feeding line on which the one or more high frequency decoupling capacitors are installed and to the power feeding line on which the one or more low frequency decoupling capacitors are installed.

(Supplementary Note 18)

The apparatus for designing power feeding line according to Supplementary Note 17, wherein the area of the power feeding line on which the one or more high frequency decoupling capacitors are installed is not more than the maximum area of the power feeding line derived in the (a).

(Supplementary Note 19)

The apparatus for designing power feeding line according to Supplementary Note 12 or 13 deriving the maximum area of a power feeding line for the operating frequency by obtaining a power feeding area with the self resonant frequency as the operating frequency of the LSI in an arithmetic equation that derives the self resonant frequency of the power feeding line having an area equivalent to an area of the circuit board based on the design information of the circuit board in (a) above.

(Supplementary Note 20)

The apparatus for designing power feeding line according to Supplementary Note 19, wherein the power feeding line is constituted by the power supply plane and the ground plane arranged in parallel, and wherein the (a) comprises deriving a maximum power feeding area S for the operating frequency f0 by obtaining a power supply feeding area (S) using the following expression:

$$S = (C\textasciicircum 2)/\{4 \times (\pi\textasciicircum 2) \times \in r \times (f0\textasciicircum 2)\}$$

(where ˆ indicates exponentiation), the above equation being derived by substituting the operating frequency f0 with fb and solving the power supply area S in an arithmetic equation:

$$fb = C \div \{2\pi \times \sqrt{(\in r \times S)}\}$$

(where S is an area of the power feeding line; ∈r is a relative dielectric constant of an insulator between power supply and ground planes; and C is a speed of light in vacuum)

that derives the self resonant frequency (fb) of the power feeding line having an area equivalent to an area of the circuit board based on the design information of the circuit board.

(Supplementary Note 21)

The apparatus for designing power feeding line according to Supplementary Note 12 or 13, wherein the design information includes the allowable power supply voltage variation value $\Delta v$ and the power supply current change value $\Delta i$, and wherein the upper limit Zt of the power feeding line impedance is derived using the following expression $$Zt=\Delta v \div \Delta i.$$

(Supplementary Note 22)

The apparatus for designing power feeding line according to Supplementary Note 21, wherein the power supply current change value $\Delta i$ is a current value obtained by subtracting a minimum value of the power supply current from a maximum value and is expressed by the following expression using the center value v of the power supply voltage, the output impedance Ro of the output buffer of the power supply, the number N of the output buffers, and the characteristic impedance Z0 of the wiring connected to the output buffer $$\Delta i = v \div (Ro+Z0) \times N$$

and wherein the (b) comprises deriving the upper limit Zt of the power feeding line impedance is derived using the following expression with $\Delta v$ denoting the allowable power supply voltage variation value and $\Delta i$ the power supply current change value in (b) above $$Zt = \Delta v \div \Delta i$$
$$= \Delta v \div \{v \div (Ro+Z0) \times N\}$$
$$= (Ro+Z0) \times rv \div N$$

(where $rv=\Delta v \div v$ being the allowable power variation rate).

(Supplementary Note 23)

A program causing a data processing apparatus (computer) that comprises a capacitor characteristic database storing a capacitance value of a capacitor associated with a resonant frequency thereof, performs decoupling for a circuit board having an LSI mounted thereon, and that designs a power feeding line to execute the following processing (a) to (c):

(a) deriving a maximum area of a power feeding line for the operating frequency of the LSI based on design information of the circuit board;

(b) deriving an upper limit of a power feeding line impedance, which is a power supply tolerance, based on the design information of the circuit board; and (c) for at least one setting frequency that is equal to or lower than the operating frequency and is in a frequency range higher than the self resonant frequency of a power feeding line having an area equivalent to an area of the circuit board, selecting a capacitor having the lowest resonant impedance and a resonant frequency close to the setting frequency with reference to the capacitor characteristic database that stores capacitor characteristic information including at least resonant frequency and resonant impedance information of a capacitor, and disposing on the power feeding line, one or more capacitors, each being the selected capacitor, as high frequency decoupling capacitors, the number thereof corresponding to a value obtained by dividing the upper limit of the power feeding line impedance by the resonant impedance of the selected capacitor.

(Supplementary Note 24)

The program according to Supplementary Note 23 causing the data processing apparatus to execute the following processing comprising:

in the (c), (d) setting the setting frequency as the operating frequency, selecting a capacitor having the lowest resonant impedance and a resonant frequency close to the setting frequency with reference to the capacitor characteristic database, and disposing one or more capacitors, each being the selected capacitor, as high frequency decoupling capacitors, on the power feeding line, the number thereof corresponding to a value obtained by dividing the upper limit of the power feeding line impedance by the resonant impedance of the selected capacitor;

(e) judging whether or not the setting frequency is higher than the self resonant frequency of the power feeding line having an area equivalent to an area of the circuit board;

(f) obtaining a new setting frequency by dividing the setting frequency by a predetermined positive integer when the setting frequency is higher than the self resonant frequency of the power feeding line having an area equivalent to an area of the circuit board;

(g) selecting a capacitor having the lowest resonant impedance and a resonant frequency close to the new setting frequency with reference to the capacitor characteristic database, disposing on the power feeding line, one or more capacitors, each being the selected capacitor, as high frequency decoupling capacitors, the number thereof corresponding to a value obtained by dividing the upper limit of the power feeding line impedance by the resonant impedance of the selected capacitor, and returning to the judgment in (e) above; and repeating (f) and (g) above until the setting frequency is lower than the self resonant frequency of the power feeding line having an area equivalent to an area of the circuit board in the judgment in (e) above.

(Supplementary Note 25)

The program according to Supplementary Note 23 or 24, causing the data processing apparatus to execute the processing comprising in the (c), setting a plurality of the setting frequencies to frequencies at which anti-resonance does not occur among a plurality of capacitors, each of which selected corresponding to the setting frequency different to each other.

(Supplementary Note 26)

The program according to Supplementary Note 23 or 24, wherein the design information includes:

the operating frequency of the LSI;

an allowable power supply voltage variation rate $rv=\Delta v/v$ ($\Delta v$ denotes a power supply voltage variation value; v a power supply voltage);

a power supply current change value $\Delta i$ $$\Delta i = v \div (Ro+Z0) \times N$$

(v: the power supply voltage; Ro: the output impedance of an output buffer of the power supply; N: the number of the output buffers; Z0: the characteristic impedance of a wiring connected to the output buffer); and a board area Sb.

(Supplementary Note 27)

The program according to Supplementary Note 24 causing the data processing apparatus to execute the processing comprising (h) disposing low frequency decoupling capacitors on a power feeding line in a periphery of the power feeding line on which the one or more high frequency decoupling capacitors are installed when the setting frequency is not higher than the self resonant frequency of the power feeding line as a result of the judgment in the (e).

(Supplementary Note 28)

The program according to Supplementary Note 27 causing the data processing apparatus to execute the processing comprising:

providing a slit that cuts out a part of a conductive member of the power feeding line between the power feeding line on which the one or more high frequency decoupling capacitors are installed and the power feeding line on which the one or more low frequency decoupling capacitors are installed, and of disposing a power supply separation filter striding over the slit and connected to the power feeding line on which the one or more high frequency decoupling capacitors are installed and to the power feeding line on which the one or more low frequency decoupling capacitors are installed.

(Supplementary Note 29)

The program according to Supplementary Note 28, wherein the area of the power feeding line on which the one or more high frequency decoupling capacitors are installed is not more than the maximum area of the power feeding line derived in the (a).

(Supplementary Note 30)

The program according to Supplementary Note 23 or 24, causing the data processing apparatus to execute the processing comprising In the (a)

deriving the maximum area of a power feeding line for the operating frequency by obtaining a power feeding area with the self resonant frequency as the operating frequency of the LSI in an arithmetic equation that derives the self resonant frequency of the power feeding line having an area equivalent to an area of the circuit board based on the design information of the circuit board.

(Supplementary Note 31)

The program according to Supplementary Note 30 causing the data processing apparatus to execute the processing comprising In the (a), deriving a maximum power feeding area S for the operating frequency f0 by obtaining a power supply feeding area (S)

$$S=(C^2)/\{4\times(\pi^2)\times\in r\times(f0^2)\}$$

(where ^ indicates exponentiation)

the above equation being derived by substituting the operating frequency f0 with fb and solving the power feeding area S in an arithmetic equation:

$$fb=C\div\{2\pi\times\sqrt{(\in r\times S)}\}$$

(where S denotes the area of the power feeding line; ∈r the relative dielectric constant of an insulator between power supply and ground planes; and C is a speed of light in vacuum)

that derives the self resonant frequency (fb) of the power feeding line having an area equivalent to an area of the circuit board based on the design information of the circuit board, wherein the power feeding line is constituted by the power supply plane and the ground plane arranged in parallel.

(Supplementary Note 32)

The program according to Supplementary Note 23 or 24, causing the data processing apparatus to execute the processing comprising deriving the upper limit Zt of the power feeding line impedance using the following expression $$Zt=\Delta v\div\Delta i,$$

wherein the design information includes the allowable power supply voltage variation value $\Delta v$ and the power supply current change value $\Delta i$.

(Supplementary Note 33)

The program according to Supplementary Note 32 causing the data processing apparatus to execute the processing comprising deriving the upper limit Zt of the power feeding line impedance using the following expression with $\Delta v$ denoting the allowable power supply voltage variation value and $\Delta i$ the power supply current change value in (b) above $$Zt = \Delta v \div \Delta i$$
$$= \Delta v \div \{v \div (Ro+Z0) \times N\}$$
$$= (Ro+Z0) \times rv \div N$$

(where rv=$\Delta v\div v$ being the allowable power variation rate),

Wherein the power supply current change value $\Delta i$ is a current value obtained by subtracting a minimum value of the power supply current from a maximum value and is expressed by the following expression using the center value v of the power supply voltage, the output impedance Ro of the output buffer of the power supply, the number N of the output buffers, and the characteristic impedance Z0 of the wiring connected to the output buffer $$\Delta i=v\div(Ro+Z0)\times N.$$

(Supplementary Note 34)

A circuit board having an LSI mounted thereon, the board comprising one or more capacitors, each having a lower resonant impedance and a resonant frequency close to a predetermined setting frequency that is equal to or lower than the operating frequency of the LSI and is in a frequency range higher than the self resonant frequency of a power feeding line of the area of the circuit board, as high frequency decoupling capacitors corresponding to the LSI, the number thereof corresponding to at least a value obtained by dividing an upper limit of the power feeding line impedance by the resonant impedance of the capacitors.

(Supplementary Note 35)

The circuit board according to Supplementary Note 34, comprising:

an insulating slit that electrically isolates a first power feeding line on which the LSI and the high frequency decoupling capacitors are installed from a second power feeding line, located in a periphery of the first power feeding line, on which low frequency decoupling capacitors are installed between the first and the second power feeding lines; and a power supply separation filter striding over the insulating slit and connected to the first power feeding line on which the one or more high frequency decoupling capacitors are installed and to the second power feeding line on which the one or more low frequency decoupling capacitors are installed.

It should be noted that other objects, features and aspects of the present invention will become apparent in the entire disclosure and that modifications may be done without departing the gist and scope of the present invention as disclosed herein and claimed as appended herewith.

Also it should be noted that any combination of the disclosed and/or claimed elements, matters and/or items may fall under the modifications aforementioned.

The invention claimed is:

1. A decoupling method for decoupling for a circuit board having an LSI (Large Scale Integrated Circuit) mounted thereon, the method comprising:
   (a) a data processing apparatus deriving a maximum area of a power feeding line supplying power to at least the LSI, for an operating frequency of the LSI, based on design information of the circuit board;
   (b) the data processing apparatus deriving an upper limit of a power feeding line impedance, based on the design information of the circuit board, the upper limit being a power supply variation tolerance; and
   (c) for one or a plurality of setting frequencies, each being equal to or lower than the operating frequency and being in a frequency range higher than a self resonant frequency of a power feeding line having an area equivalent to an area of the circuit board,
   the data processing apparatus selecting a capacitor having a lowest resonant impedance and a resonant frequency corresponding to the setting frequency, with reference to a capacitor characteristic database that stores capacitor characteristic information including at least resonant frequency and resonant impedance information of a capacitor, and
   installing on the power feeding line, one or more capacitors, each being the selected capacitor, as high frequency decoupling capacitors, the number thereof corresponding to a value obtained by dividing the upper limit of the power feeding line impedance by the resonant impedance of the selected capacitor, whereby the circuit board is decoupled.

2. The decoupling method according to claim 1, wherein the step (c) comprises:
   (d) the data processing apparatus selecting a capacitor having a lowest resonant impedance and a resonant frequency corresponding to the setting frequency with reference to the capacitor characteristic database, with the setting frequency being set to the operating frequency, and installing one or more capacitors, each being the selected capacitor, as high frequency decoupling capacitors, the number thereof corresponding to a value obtained by dividing the upper limit of the power feeding line impedance by the resonant impedance of the selected capacitor;
   (e) the data processing apparatus judging whether or not the setting frequency is higher than the self resonant frequency of the power feeding line having an area equivalent to an area of the circuit board;
   (f) the data processing apparatus obtaining a new setting frequency by dividing the setting frequency by a predetermined positive integer, when the setting frequency is higher than the self resonant frequency of the power feeding line having an area equivalent to an area of the circuit board;
   (g) the data processing apparatus selecting a capacitor having a lowest resonant impedance and a resonant frequency corresponding to the new setting frequency with reference to the capacitor characteristic database, installing one or more capacitors, each being the selected capacitor, each being the selected capacitor, as high frequency decoupling capacitors, the number thereof corresponding to a value obtained by dividing the upper limit of the power feeding line impedance by the resonant impedance of the selected capacitor, and returning to the judgment of the step (e); and
   the data processing apparatus repeating the step (f) and the step (g) until the setting frequency is lower than the self resonant frequency of the power feeding line having an area equivalent to an area of the circuit board in the judgment in the step (e).

3. The decoupling method according to claim 2, comprising:
   (h) installing one or more low frequency decoupling capacitors on a second power feeding line in a periphery of a first power feeding line on which the one or more high frequency decoupling capacitors are installed, in the case where the setting frequency (f) is not higher than the self resonant frequency (fb) of the power feeding line as a result of the judgment in the step (e).

4. The decoupling method according to claim 3, wherein the area of the first power feeding line on which the one or more high frequency decoupling capacitors are installed is not more than the maximum area of the power feeding line derived in the step (a).

5. The decoupling method according to claim 3, further comprising:
   providing a slit that cuts out a part of the power feeding line to electrically isolate the first power feeding line from the second power feeding line between the first power feeding line on which the one or more high frequency decoupling capacitors are installed and the second power feeding line on which the one or more low frequency decoupling capacitors are installed; and
   installing a power supply separation filter striding over the slit and connected to the first and the second power feeding lines.

6. The decoupling method according to claim 2, further comprising:
   providing a slit that cuts out a part of the power feeding line to electrically isolate the first power feeding line from the second power feeding line between the first power feeding line on which the one or more high frequency decoupling capacitors are installed and the second power feeding line on which the one or more low frequency decoupling capacitors are installed; and
   installing a power supply separation filter striding over the slit and connected to the first and the second power feeding lines.

7. The decoupling method according to claim 1, wherein the step (c) comprises:
   the data processing apparatus setting a plurality of the setting frequencies to frequencies at which anti-resonance does not occur in a plurality of capacitors, respectively selected corresponding to setting frequencies different to each other.

8. The decoupling method according to claim 1, wherein the step (a) comprises:
   the data processing apparatus deriving the maximum area of a power feeding line for the operating frequency by solving a power feeding area, with the self resonant frequency being set as the operating frequency of the LSI, using an arithmetic equation that derives the self resonant frequency of the power feeding line having an area equivalent to an area of the circuit board, based on the design information of the circuit board.

9. The decoupling method according to claim 8, wherein the power feeding line is composed by a power supply plane and a ground plane arranged in parallel, and wherein the step (a) comprises:
   the data processing apparatus deriving a maximum area S of the power feeding line for the operating frequency f0, using the following equation:

$$S = (C^2)/\{4 \times (\pi^2) \times \in r \times (f0^2)\}$$

(where ˆ indicates exponentiation),
the above equation being derived by substituting the operating frequency f0 with fb and solving S in an arithmetic equation:

$$fb = C \div \{2\pi \times \sqrt{(\in r \times S)}\}$$

(where S is an area of the power feeding line, ∈r is a relative dielectric constant of an insulator between a power supply plane and a ground plane, and C is a speed of light in vacuum), the arithmetic equation deriving the self resonant frequency (fb) of the power feeding line having the area S.

10. The decoupling method according to claim 1, wherein the design information includes
a power supply voltage variation tolerance Δv and a power supply current change value Δi, and wherein
the step (b) comprises:
the data processing apparatus deriving the upper limit Zt of the power feeding line impedance using the following expression:

$$Zt = \Delta v \div \Delta i.$$

11. A power feeding line design apparatus that performs decoupling for a circuit board having an LSI mounted thereon, the apparatus comprising:
a capacitor characteristic database embodied in a non-transitory storage medium and configured to store a capacitance value of a capacitor associated with a resonant frequency and a resonant impedance thereof;
a data processing hardware unit configured to derive a maximum area of a power feeding line supplying power to at least the LSI for an operating frequency of the LSI—with reference to design information of the circuit board;
a data processing hardware unit configured to derive an upper limit of a power feeding line impedance with reference to the design information of the circuit board, the upper limit being a power supply variation tolerance; and
a data processing hardware unit configured to for one or a plurality of setting frequencies, each being equal to or lower than the operating frequency and being in a frequency range higher than a self resonant frequency of a power feeding line having an area equivalent to an area of the circuit board, select a capacitor having a lowest resonant impedance and a resonant frequency corresponding to the setting frequency, with reference to the capacitor characteristic database, and to install one or more capacitors, each being the selected capacitor, as high frequency decoupling capacitors, the number thereof corresponding to a value obtained by dividing the upper limit of the power feeding line impedance by the resonant impedance of the selected capacitor.

12. A circuit board having an LSI mounted thereon, the board comprising:
a power feeding line configured to supply a power to at least the LSI; and
one or more capacitors, as high frequency decoupling capacitors, installed on the power feeding line, each of the capacitors having a lowest resonant impedance and a resonant frequency corresponding to a predetermined setting frequency that is equal to or lower than an operating frequency of the LSI and is in a frequency range higher than a self resonant frequency of a power feeding line having an area equivalent to an area of the circuit board, the number of the one or more capacitors corresponding to at least a value obtained by dividing an upper limit of the power feeding line impedance by the resonant impedance of the capacitor.

13. The circuit board according to claim 12, wherein the power feeding line includes:
a first power feeding line on which the LSI and the one or more high frequency decoupling capacitors are installed; and
a second power feeding line located in a periphery of the first power feeding line, one or more low frequency decoupling capacitors installed on the second power feeding lines, the circuit board comprising:
an insulating slit that electrically isolates the first power feeding line from the second power feeding line; and
a power supply separation filter striding over the insulating slit and connected to the first power feeding line and to the second power feeding line.

* * * * *